US011959950B2

(12) United States Patent
Xu et al.

(10) Patent No.: US 11,959,950 B2
(45) Date of Patent: Apr. 16, 2024

(54) METHOD AND APPARATUS FOR POWER MEASUREMENT IN ELECTRONIC CIRCUIT DESIGN AND ANALYSIS

(71) Applicant: Arm Limited, Cambridge (GB)

(72) Inventors: Xiaoqing Xu, Austin, TX (US); Zhiyao Xie, Durham, NC (US); Shidhartha Das, Upper Cambourne (GB); Matthew James Walker, Cambridge (GB); Kumara Guru Palaniswamy, Austin, TX (US); Matthew Paul Elwood, Austin, TX (US)

(73) Assignee: Arm Limited, Cambridge (GB)

( * ) Notice: Subject to any disclaimer, the term of this patent is extended or adjusted under 35 U.S.C. 154(b) by 174 days.

(21) Appl. No.: 17/218,670

(22) Filed: Mar. 31, 2021

(65) Prior Publication Data
US 2022/0164511 A1    May 26, 2022

Related U.S. Application Data

(60) Provisional application No. 63/116,496, filed on Nov. 20, 2020, provisional application No. 63/116,502, filed on Nov. 20, 2020.

(51) Int. Cl.
*G01R 21/133*    (2006.01)
*G01R 31/317*    (2006.01)
(Continued)

(52) U.S. Cl.
CPC ..... *G01R 21/133* (2013.01); *G01R 31/31727* (2013.01); *G05B 13/02* (2013.01);
(Continued)

(58) Field of Classification Search
CPC ............ G01R 21/133; G01R 31/31727; G06F 30/367; G06F 30/3308; G06F 2119/06; G05B 13/02; G05B 15/02; G05F 1/66
See application file for complete search history.

(56) References Cited

U.S. PATENT DOCUMENTS 8,650,413 B2    2/2014    Bose et al.
10,909,283 B1 *    2/2021    Wang ..................... G06F 30/331
(Continued)

OTHER PUBLICATIONS

Kim et al. Simmani: Runtime Power Modeling for Arbitrary RTL with Automatic Signal Selection (Year: 2019).*
(Continued)

*Primary Examiner* — Kyle R Quigley
(74) *Attorney, Agent, or Firm* — Leveque Intellectual Property Law, P.C.

(57) ABSTRACT

A power meter for measuring power usage in a circuit includes preprocessor and a weighting network. The pre-processor is configured to receive toggle data for a number of power proxy signals in the circuit for a plurality of clock cycles of the circuit in a first time window. The power proxy signals and weighting values are determined automatically from simulated or emulated toggle data. For each power proxy signal, the pre-processor averages the toggle data over one or more clock cycles in one or more second time windows, within the first time window, to provide averaged toggle data, and outputs the averaged toggle data for each second time window. The weighting network is configured to combine the averaged toggle data from the power proxy signals, based on a set of weight values, to provide a measure of the power usage.

20 Claims, 22 Drawing Sheets

(51) Int. Cl.
  *G05B 13/02* (2006.01)
  *G05B 15/02* (2006.01)
  *G05F 1/66* (2006.01)
  *G06F 30/3308* (2020.01)
  *G06F 30/367* (2020.01)
  *G06F 119/06* (2020.01)

(52) U.S. Cl.
  CPC ............. *G05B 15/02* (2013.01); *G05F 1/66* (2013.01); *G06F 30/3308* (2020.01); *G06F 30/367* (2020.01); *G06F 2119/06* (2020.01)

(56) References Cited

U.S. PATENT DOCUMENTS

| | | | | |
|---|---|---|---|---|
| 2006/0277509 A1* | 12/2006 | Tung | ................ | G06F 30/33 716/109 |
| 2008/0092092 A1* | 4/2008 | Dalton | ................ | G06F 30/33 716/108 |
| 2009/0271167 A1* | 10/2009 | Zhu | ................ | G06F 30/331 703/14 |
| 2010/0268930 A1* | 10/2010 | Bose | ................ | G06F 11/3062 713/340 |
| 2011/0047402 A1* | 2/2011 | Carney | ................ | H03K 5/131 713/501 |
| 2012/0036375 A1* | 2/2012 | Puschini Pascual | .. | G06F 9/5027 713/300 |
| 2015/0295410 A1* | 10/2015 | Hooshmand | ........... | G06Q 50/06 307/20 |
| 2017/0018923 A1* | 1/2017 | Rombouts | ............. | G06Q 50/06 |
| 2019/0029600 A1* | 1/2019 | Hutchinson | ............. | A61B 5/08 |
| 2020/0068680 A1* | 2/2020 | Neudorf | ................. | H05B 45/10 |
| 2020/0134363 A1* | 4/2020 | Hubenig | ................ | G06N 20/00 |
| 2021/0109908 A1* | 4/2021 | Patil | ..................... | G06F 16/219 |
| 2021/0158155 A1* | 5/2021 | Zhang | ..................... | G06N 3/08 |

OTHER PUBLICATIONS

Kim et al., Simmani: Runtime Power Modeling for Arbitrary RTL with Automatic Signal Selection. In Proceedings of the 52nd Annual IEEE/ACM International Symposium on Microarchitecture (MICRO '52). Association for Computing Machinery, New York, NY, USA, 2019, 1050-1062.

Zhou et al., PRIMAL: Power Inference using Machine Learning. In Proceedings of the 56th Annual Design Automation Conference 2019 (DAC '19). Association for Computing Machinery, New York, NY, USA, Article 39, 1-6.

Chapter 7 of Parr, Parr, E.A., & Parr, E.A. (E.A. (1993). Logic designer's handbook: circuits and systems (2nd ed.). Newnes. (Year: 1993).

Chapter 8 of Parr, Parr, E.A., & Parr, E.A. (E.A. (1993). Logic designer's handbook: circuits and systems (2nd ed.). Newnes. (Year: 1993).

* cited by examiner

METHOD AND APPARATUS FOR POWER MEASUREMENT IN ELECTRONIC CIRCUIT DESIGN AND ANALYSIS

RELATED APPLICATIONS

This application claims the benefit of provisional application Ser. No. 63/116,502 filed Nov. 20, 2020 and titled 'METHOD AND APPARATUS FOR POWER MEASUREMENT IN ELECTRONIC CIRCUIT DESIGN AND ANALYSIS', the entire content of which is hereby incorporated by reference.

This application also claims the benefit of provisional application Ser. No. 63/116,496 filed Nov. 20, 2020 and titled 'METHOD AND APPARATUS FOR ON-CHIP POWER METERING USING AUTOMATED SELECTION OF SIGNAL POWER PROXIES', the entire content of which is hereby incorporated by reference herein.

This application is related to application titled 'METHOD AND APPARATUS FOR ON-CHIP POWER METERING USING AUTOMATED SELECTION OF SIGNAL POWER PROXIES', and filed on even date herewith. The entire content of this application is hereby incorporated by reference herein.

BACKGROUND

The present disclosure relates to a method and apparatus for power measurement in a digital electronic circuit. More particularly, the disclosure relates to a method for generating power proxies for input to a power measurement system.

A digital electronic device typically operates in synchrony with a clock signal, with the state of the device changing at each clock cycle. The functional behavior of a device may be modeled as collection of registers linked by combinatorial logic. This can be described using a register transfer language (RTL). The state of the device in any given clock cycle is given by the values of these registers.

The power usage of the device is related to changes in the register values. For a circuit with a relatively small number of registers, computer simulations may be used to determine the power usage of the circuit. However, for a larger circuit with hundreds of thousands of registers and operating at a clock rate of several gigahertz, such simulations are computationally expensive.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

Figure 1A:
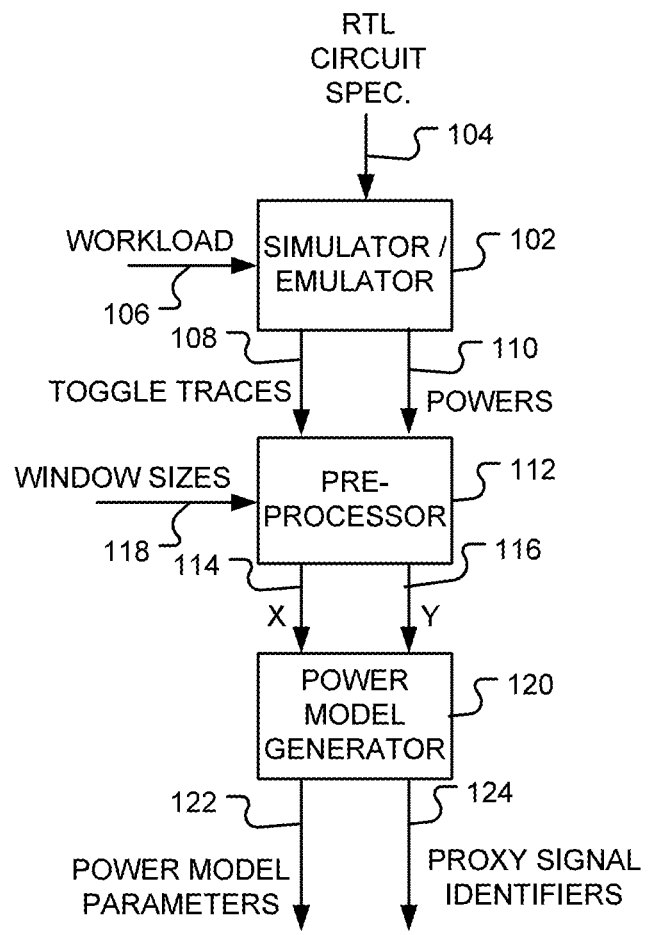
FIG. 1A is a diagrammatic representation of a method for generating a power model, in accordance with embodiments of the disclosure.

The various apparatus and devices described herein provide mechanisms for measuring power usage in a digital electronic circuit.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "configured to", when applied to an element, means that the element may be designed or constructed to perform a designated function, or has the required structure to enable it to be reconfigured or adapted to perform that function.

Power efficiency is a primary design objective for modern very large scale integrated (VLSI) designs, with targeted applications ranging from embedded systems, mobile computing to cloud data centers. Power modeling and analysis methodology is a critical component to boost design power efficiency across different abstraction levels. The early-stage power modeling at the System on a Chip (SoC) provides per-unit power breakdown based on technology parameters and a limited number of event statistics are monitored for runtime power monitoring, which contributes to the fine-grained on-chip power and thermal management schemes for state-of-the-art SoCs. The architectural and micro-architectural modeling adopts the performance counters as input parameters to obtain regression-based power models, which are further used to explore the power and performance trade-offs before the design, specified by its RTL description, and downstream implementation are available. While the aforementioned approaches are crucial for fast early-stage design space exploration and power optimization, designers must rely on the commercial power analysis tooling at the RTL level and downstream to obtain accurate power numbers and trustworthy correlations to the hardware measurement.

The major limitation of the power analysis flow at the RTL level and downstream is that it is extremely slow. The netlist-level power analysis, as the sign-off standard, is prohibitively slow to enable per-cycle power simulation. The present disclosure recognizes that the reasons for such speed problem are two-fold. First, the workload-based power analysis relies on target benchmarks to be compiled and run on the design RTL, e.g., RTL simulation, to generate per-signal simulation traces or toggling activities for all RTL signals. The large-scale benchmarks could be extremely time-consuming for the RTL simulation, which makes the overall power analysis flow unscalable. In an attempt to solve the scalability challenge of the RTL simulation, an emulation-based platform has been adopted for power analysis, including emulating large-scale benchmarks on the RTL and prototype the regression-based power models onto the emulator platform. Second, power analysis flow performs instance-based look-up-table (LUT) operations based on the parasitic details annotated from the back-end implementation of the design RTL. A state-of-art digital block, such as a microprocessor, is at the scale of millions of logic gates and nets, which makes the power calculation itself time-consuming.

The present disclosure provides fast yet accurate RTL-level power modeling that can enhance simulator-based and emulator-based solutions.

An embodiment of the disclosure provides a mechanism for pre-processing or organizing data in time windows for input to a data-driven model for measuring power in a circuit. The power model may be implemented in software or hardware.

Data-driven models, also referred to as machine learning (ML) models or black box models, are automatically trained so that a given set of input values produces a given set of output values. In power modeling, the input values are related to the state of the device at various times, while the output values relate to the corresponding powers (determined by some other means).

Data-driven power models may be used for both fast offline power simulation and runtime power monitoring. However, for large circuits, learning-based power models are too complex because of the large amount of data in each state vector and the large number of state vectors. One approach to mitigating this problem is to reduce the number signals in the state vector. This may be done manually by a designer or automatically, such as by a signal clustering mechanism. A further approach is to reduce the number of state vectors by averaging both inputs and outputs over a number of cycles. In both approaches, the reduced data set is used to train a power model. However, either approach is far from being optimal, since the data reduction and modelling are carried out independently.

FIG. 1A is a diagrammatic representation of a method 100 for generating a power model in accordance with embodiments of the disclosure. Training data is generated by a simulator or emulator 102. The circuit to be modeled may be specified by a register transfer language (RTL) description 104, for example. The RTL describes the functional behavior of the circuit in terms of a set of registers and combinatorial logic that links them. The RTL itself may be generated from a description in a higher level language such as C or C++. The simulator or emulator 102 executes a workload 106 and produces a set of toggle traces 108 for each signal in the circuit and corresponding powers 110 at each cycle of operation.

This data is then organized in pre-processor 112 to produce input vectors X (also referred to as feature vectors herein) 114 and output (power) vector Y, 116. Pre-processor 112 arranges the data in accordance with designated data window sizes 118. In the embodiment shown in FIG. 1, the input vectors X 114 and output vector Y, 116 are provided to power model generator 120 that, in turn, produces power model parameters 122 and identifiers 124 of the toggle signals selected to be used as inputs to the power model. In contrast to prior approaches, the power model generator 120 produces a model that uses only the selected subset of toggle signals as inputs. That is, the selection of the signal subset and training of the model are performed together. In prior schemes these elements are performed sequentially, resulting in an inferior model. A more detailed description of the pre-processor is provided below.

Figure 1B:
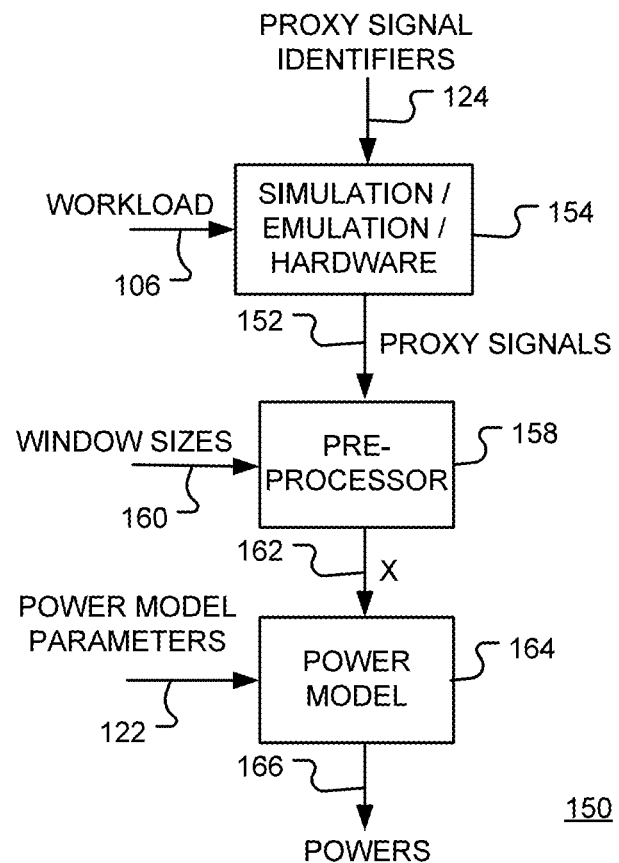
FIG. 1B is a diagrammatic representation of a mechanism for data-driven power measurement, in accordance with embodiments of the disclosure.

FIG. 1B is a diagrammatic representation of a mechanism 150 for data-driven power measurement in accordance with embodiments of the disclosure. Proxy signals 152, such as toggle traces, are produced by processing element 154, which may be a simulator, an emulator or a hardware implementation of the electrical circuit, for example, executing workload 156. Proxy signals 152 are provided for each signal identified by proxy signal identifiers 122. While the circuit may generate a large number (e.g. hundreds of thousands) of signals, only a subset of the signals is identified as proxy signals (e.g. several tens or several hundreds). Proxy signals 152 are organized in pre-processor 158, dependent upon data window sizes 160, to produce input vectors (X) 162 for power model 164. Power model 164 power model parameters 122, determined when the power model was trained, to produce the power usage, 166, of the circuit. Pre-processor 158 and power model 164 may be implemented hardware or software or a combination thereof. Pre-processor 158 and power model 164 may be operated off-line or during operation of an implemented circuit.

An embodiment of the disclosure provides a power meter for measuring power usage in a circuit. The power meter includes a pre-processor configured to receive toggle data for a number of power proxy signals in the circuit for a plurality of clock cycles of the circuit in a first time window. Herein, the term "toggle data" refers to signal toggling activities, signal levels or other signal data from which toggling activities can be derived. For each power proxy signal, the pre-processor averages the toggle data over one or more clock cycles in one or more second time windows, within the first time window, to provide averaged toggle data, and outputs the averaged toggle data for each second time window. The power meter also includes a weighting network configured to combine the averaged toggle data from the power proxy signals, based on a set of weight values, to provide the power usage. For example, the measured power usage may be produced as a weighted sum of the averaged toggle data.

The preprocessor may receive toggle data in a plurality of overlapping first time windows.

The power meter may also include one or more change detectors configured to receive power proxy signals from the circuit and produce the toggle data therefrom.

The present disclosure also provides a method for measuring power usage of a circuit. The method includes receiving toggle data for a plurality of power proxy signal in the circuit for a plurality of clock cycles of the circuit in a first time window and, for each of the power proxy signal, averaging the toggle data over one or more clock cycles in one or more second time windows, within the first time window, to provide averaged toggle data. The averaged toggle data from the one or more second time windows and the power proxy signals are combined, based on a set of weight values, to provide the power usage.

Combining the averaged toggle data may include forming a sum of the toggle data weighted by the set of weight values, for example. In this case the averaging may be performed before or after the combining.

The disclosure also provides a method for configuring a power meter. The method includes providing toggle data for a number of signals in a circuit for a plurality of clock cycles and generating a plurality of feature vectors, each feature vector dependent upon the toggle data for a plurality of clock cycles in a first time window. For each of the plurality of feature vectors, a target power usage value is generated from power usage data for the circuit in a second time window and a power model is determined based on the plurality of feature vectors and corresponding target power usage values. The power model may be determined by modeling a first power usage as a weighted sum of toggle data in a feature vector for a set of weight values. The values of the weight values are determined to minimize a loss function that includes a difference between a power usage and the modelled power usage, and penalty function of the weight values. At the same time, a subset of the plurality of signal is selected as power proxy signals, the subset corresponding to weight values with non-zero values. The power proxy signals and the corresponding subset of weight values are determined simultaneously. The power model is specified by identifiers of the power proxy signals and the corresponding subset of weight values. The model comprises a weighted sum of toggle data for the power proxy signals. In one embodiment, the difference may is a squared difference over a number of clock cycles and the penalty function of the weight values is a minimax concave penalty (MCP) function of the weight values.

Values of the subset of weight values may be refined using regression.

A hardware emulation of the circuit for a selected workflow may be used to provide the signals. The toggle data may be determined from transitions in the signals or from levels of signals. Alternatively, toggle data and power usage may be generated by simulating a workflow for the circuit.

The first power usage may be modelled by forming a weighted sum of toggle data from the power proxy signals for a number of clock cycles in a first time window and using the set of weight values, to provide the first power usage. The power usage may be determined for overlapping time windows.

In a further embodiment, toggle data for each power proxy signals is averaged over a number of clock cycles in a second time window, within the first time window, to provide averaged toggle data. The weighted sum of toggle data is formed as a weighted sum of the averaged toggle data.

A power meter may be coupled to the circuit to receive the power proxy signals and configured to generate the toggle data therefrom.

Embodiments of the disclosure relate to a fast power model with configurable measurement window size. In particular, a method is disclosed to use a per-cycle toggle data matrix and a per-cycle power measurement vector to calibrate a power model for a user configured window size. A per-cycle toggle data matrix may be generated by concatenating the per-cycle toggle count for each signal, for example, or by concatenating the average toggle data within a fixed window size smaller than or equal to the user configured window size. A per-window power measurement vector may be generated by averaging the per-cycle power measurement within the user configured window, or by averaging the average per-window power measurement within a fixed window size smaller than or equal to the user configured window size. The toggle data matrix and power measurement vector are used for an iterative training process, where different variables belonging to the same signal are updated in a group manner to converge to zeros simultaneously. The simultaneous signal selection and power model calibration can be performed multiple times, iteratively.

Further embodiments relate to off-line power analysis. In particular, a fast per-cycle power tracing methodology for large scale workloads is disclosed in which signal traces are generated using emulators and/or simulators. Signal traces are saved only for selected signals, to be used as power proxies. The selected signal traces are processed into signal toggle data and then applied to the power model to generate power traces. The signal traces can be saved in various formats, e.g., fsdb, vcd, saif, etc. The generated power traces can be per-cycle power traces or the average power over any user-set window size.

Still further embodiments relate to a technique for fast power tracing that uses per signal toggle data and measured power consumption to simultaneously select a subset of signal toggle data and calibrate a power model. The per-signal toggle data and measured power consumption can be collected from any machine generated or handcrafted benchmarks on the target design. The per-signal toggle data and measured power consumption can be collected in a timing window granularity of one or more clock cycles. The per-signal toggle data and measured power consumption can be collected at performance modelling stage, RTL implementation stage, gate implementation stage, etc. A power model can be calibrated by using a subset of or all signal toggle data In a process of simultaneous signal selection and power model calibration, regression with regularization may be performed to remove corresponding signal features with zero weights and, optionally, negative weights.

The proposed method is compatible with various regression approaches, such as Lasso regression and minimax concave penalty regression, and the simultaneous signal selection and power model calibration can be performed multiple times, iteratively. After the simultaneously signal selection and power model calibration, the proposed flow is compatible with additional regression steps, such as ridge regression to enhance the power model accuracy.

Data Collection

Figure 2:
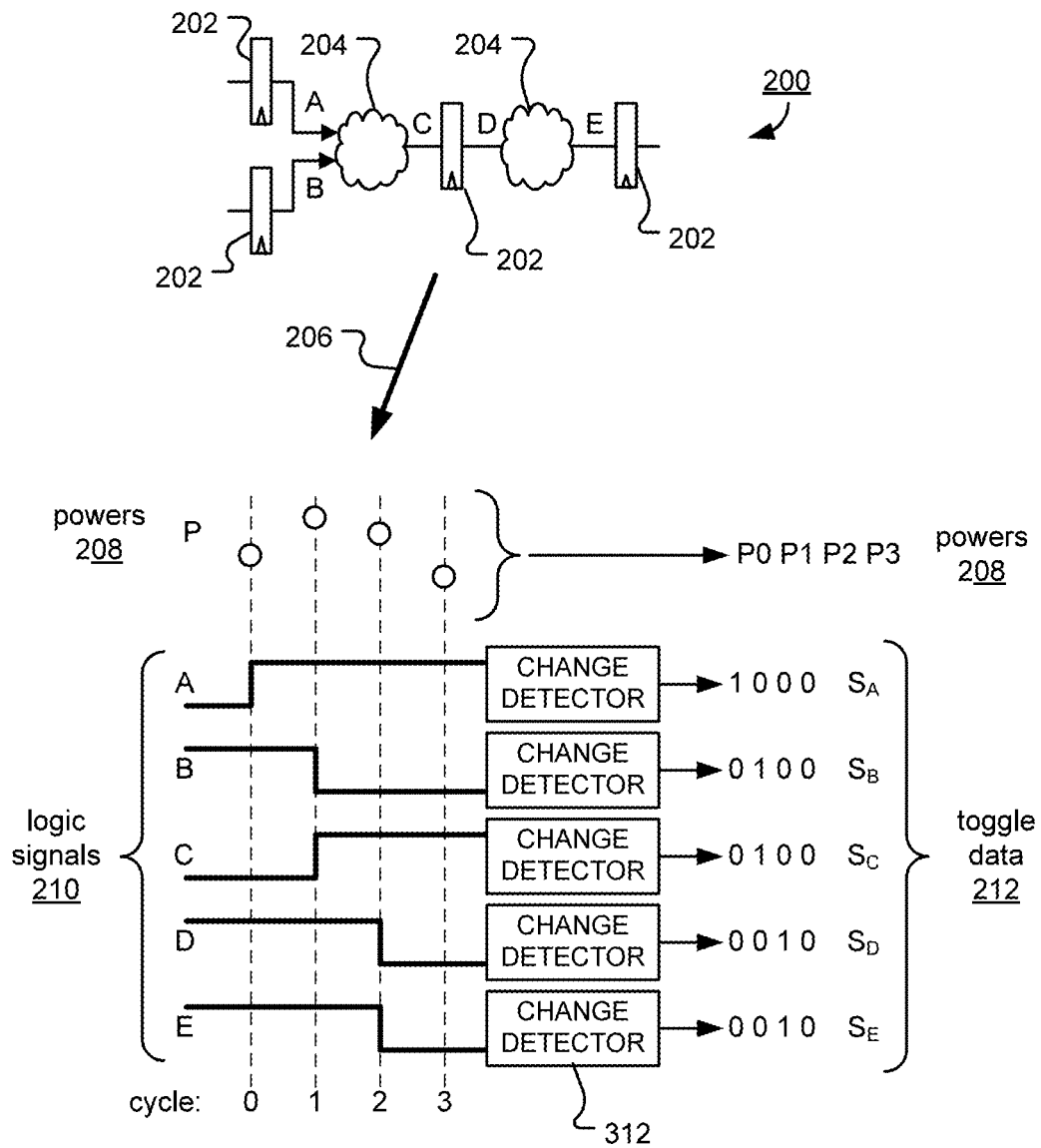
FIG. 2 is a diagrammatic representation of data collection for use in designing a power meter, in accordance with embodiments of the disclosure.

FIG. 2 is a diagrammatic representation of data collection for use in designing a power meter, in accordance with embodiments of the disclosure. In the simple example shown, a circuit 200 is specified in RTL. The circuit may include, for example, registers 202 and combinatorial logic 204. For a designated workflow, signals at locations in the circuit (e.g. locations or nodes A, B, C, D and E) may be determined in each clock cycle using an emulator or a simulator, as indicated by arrow 206. In addition, power usage is determined. The determined power levels 208, at clock cycles 0, 1, 2 and 3, are denoted as powers P0, P1, P2 and P3. The determined signals are shown as logic signal traces 210. Each trace corresponds to a voltage or logic level at a node or location in the circuit. Toggle data 212 (sequences $S_A$, $S_B$, $S_C$, $S_D$ and $S_E$) are generated from the signal traces using signal change detectors 214. In this example, a toggle data value of 1 denotes a signal level change within the current clock cycle, while a toggle data value of 0 indicates no change. Herein, the term "toggle data" shall refer to any data derived from the proxy signals and, in particular, shall include both signal transition data (where, for example, "1" denotes a signal change in a clock cycle and "0" denotes no change) and signal level data (where, for example, "1" denotes a first signal level and "0" denotes a second signal level. Some of the example embodiments are described in terms of toggling activities, which are signal transition data, but it will be apparent to those of ordinary skill in the art that other forms of toggle data may be used.

Pre-Processor

Figure 3A:
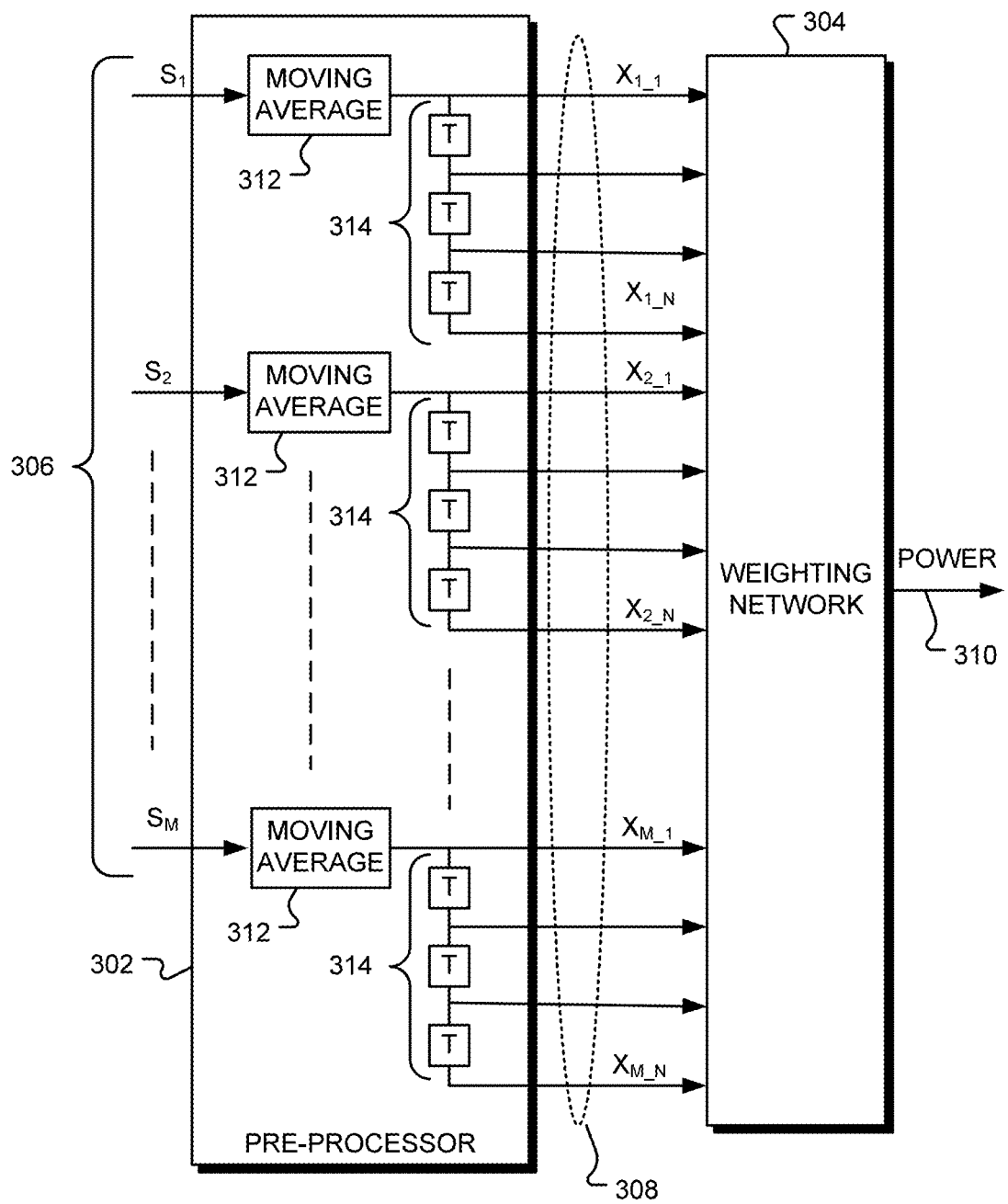
FIG. 3A is a block diagram of a power meter, in accordance with embodiments of the disclosure.

FIG. 3A is a block diagram of a power meter 300 in accordance with embodiments of the disclosure. Power meter 300 includes pre-processor 302 and weighting network 304. The pre-processor receives toggle data 306 as inputs and produces a sequence of feature vectors 308 as output. Weighting network 304 produces a measure 310 of the power usage as output. In one embodiment, weighting network 304 computes a weighted of the elements $X_i$ of the feature vector 308.

Pre-processor 302 may, optionally, include moving average filters 312. In one embodiment, the moving average filters compute, for each clock cycle, an average of the toggle data 306 over a specified number of clock cycles.

Pre-processor 302 includes tapped delay lines 314. In the example shown, each delay line contains 3 delay elements, but any number of elements may be used.

Feature vector 308 is dependent upon toggle data from a first time window, the toggle data being averaged over a second time window.

In an embodiment where the weighting network is a simple sum of weighted elements, the order of the summations in the moving average filter and the weighted network may be reversed or the summations may be combined when the power meter is used for inference.

Figure 3B:
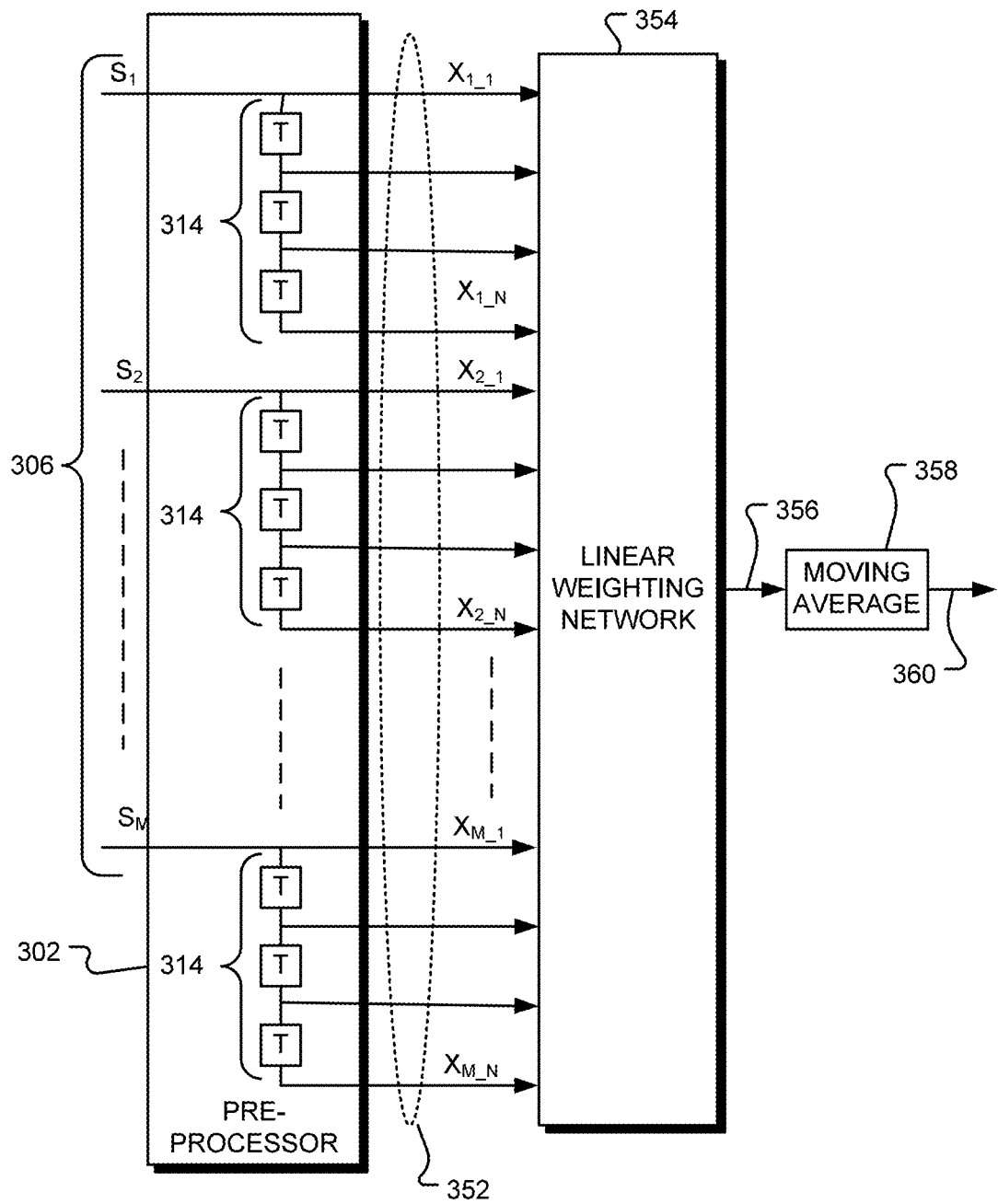
FIG. 3B is a block diagram of a further power meter, in accordance with embodiments of the disclosure.

FIG. 3B is a block diagram of a further embodiment of power meter 350 in accordance with embodiments of the disclosure. This embodiment performs the same function as power meter 350 in the case when the weighting network 300 is a linear weighting network 350. Feature vector 352 includes toggle data in a time window defined by tapped delay lines 314. Output signal 356 is passed through moving average filter 358 to provide the final power usage estimate 360.

Figure 4A:
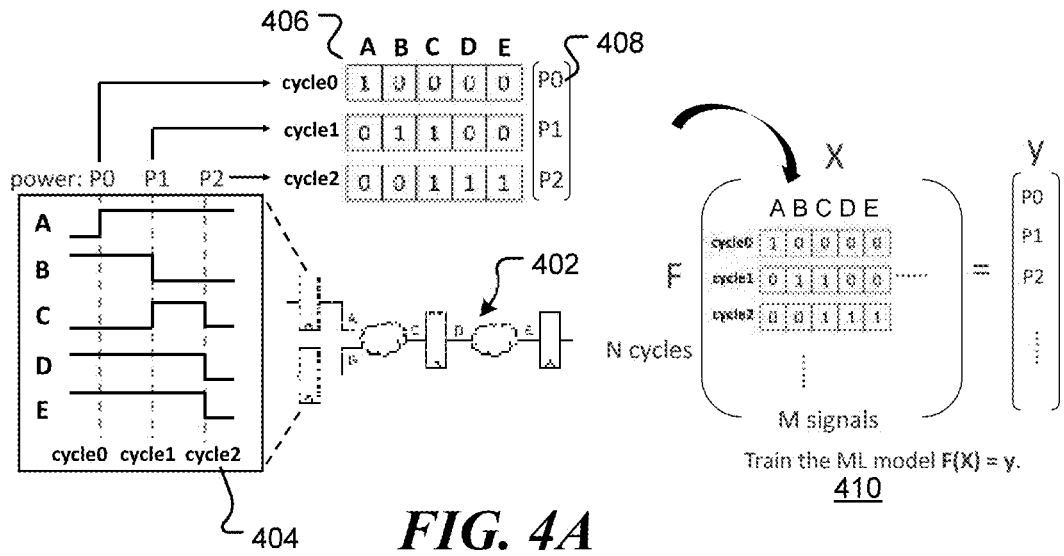
FIG. 4A shows an example of data collection for power meter design, with no preprocessing.

FIG. 4A shows an example of data collection for use in training a power model. In the simple example shown, a circuit design 402 is specified in RTL and used in an emulator or simulator to calculate toggle traces 404 for a chosen workload. Each trace corresponds to a voltage or logic level at a node or location of the circuit (nodes identified as A, B, C, D and E in this example). Toggle data 406 is generated from the toggle traces. Toggle data for each clock cycle indicates whether there is a corresponding transition in the toggle in that cycle. Power usage 408 in each cycle is also computed. Each row of matrix 406 corresponds to a feature vector, each element of vector 408 is a power measure.

Power usage may be modeled as F(X)=Y, where X is the toggle data matrix 406, Y is a vector of measured powers and F is a function (such as weighted sum of the elements of X). This is depicted as 410 in FIG. 4A.

In this example there is no preprocessing. There is no moving average filter or tapped delay line in the power model—i.e. no windowing of the toggle data. Put another way, the first and second time windows have length 1 cycle.

Figure 4B:
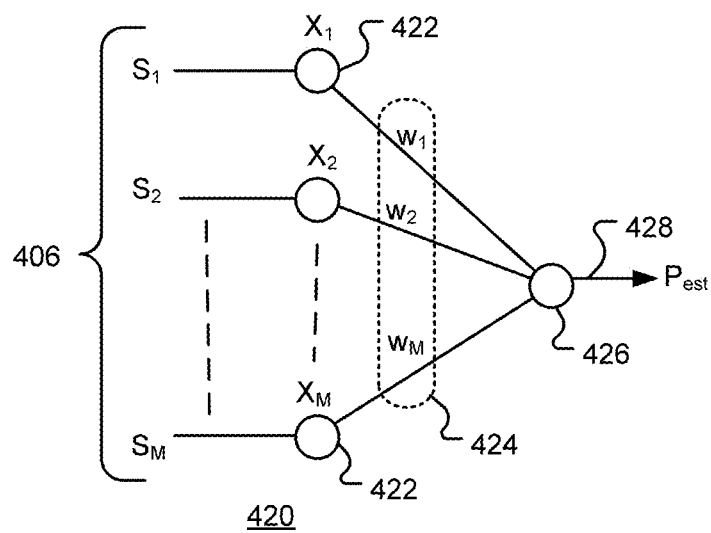
FIG. 4B shows a signal flow diagram example of a power meter design, with no preprocessing.

FIG. 4B shows a signal flow graph 420 for a corresponding power model. Toggle data 406 is used directly to provide feature vector 422. Elements $(X_1, X_2, \ldots, X_M)$ of the feature vector are weighted by weight values 424 $(W_1, W_2, \ldots, W_M)$ in a weighting network and summed at 426 to provide power estimate 428 ($P_{est}$).

Figure 5A:
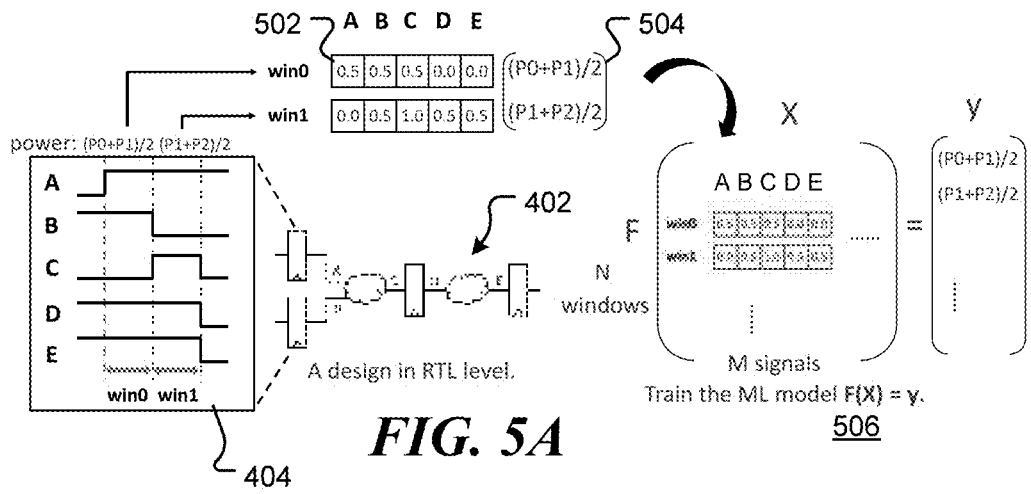
FIG. 5A shows an example of data pre-processing for power meter design using moving average filters, in accordance with embodiments of the disclosure.

FIG. 5A shows an example where the averaging is performed over 2 cycles. The average performed by multiplying consecutive toggle values by coefficients [0.5, 0.5] and summing. Both the first and second time windows have length 2 cycles.

Figure 5B:
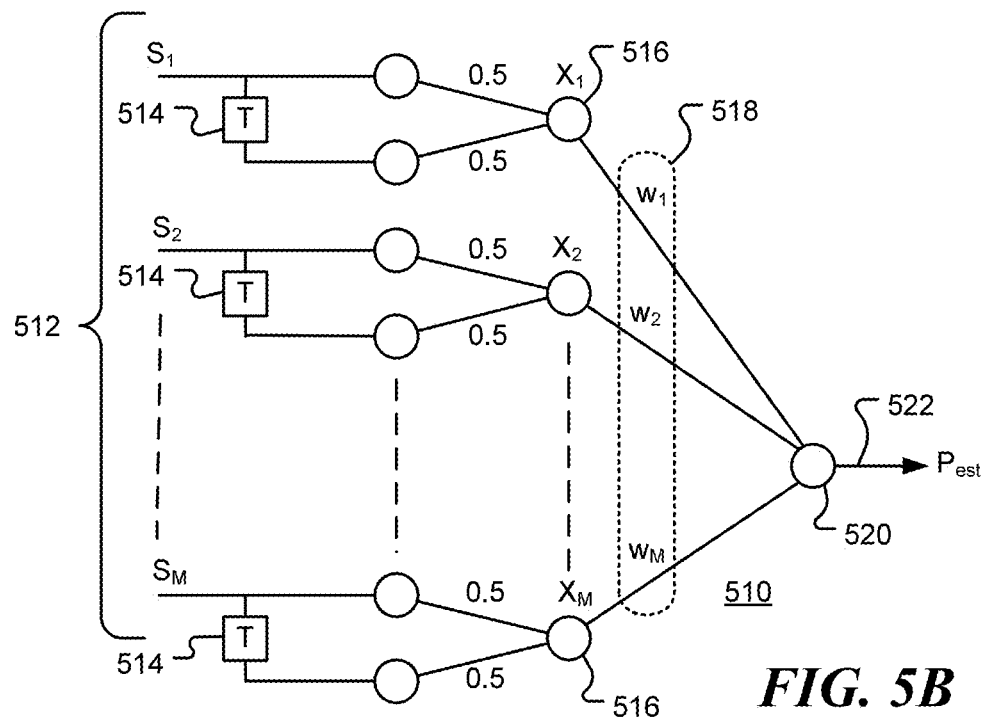
FIG. 5B and FIG. 5C show signal flow diagrams of example data pre-processing for power meter design using moving average filters, in accordance with embodiments of the disclosure.

FIG. 5B shows a corresponding signal flow graph 510 of an embodiment of the power model. Each sequence of toggle data 512 ($S_1, S_2, \ldots, S_M$) is fed into a moving average filter with a single delay element 514. The toggle data from current and prior clock cycles are scaled by 0.5 and summed in adders 516 to provide an average from the two clock cycles. The resulting averaged toggle data provides elements ($X_1, X_2, \ldots, X_M$) of the feature vector are weighted by weight values 518 ($W_1, W_2, \ldots, W_M$) in a weighting network and summed at 520 to provide power estimate 522 ($P_{est}$). FIG. 5B denotes logical signal flow. In practice, the model could be implemented using various structures. It will be apparent, for example, that the 0.5 weighting values may be be incorporated into the weight values 518 to reduce the number of multiplication operations used. Alternatively, the 0.5 weighting may be applied to the inputs or to the outputs of adders 516.

Figure 5C:
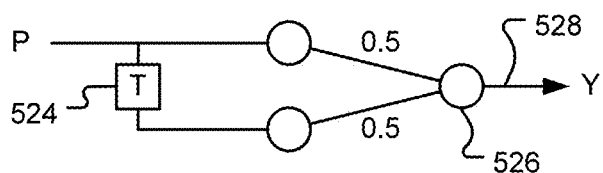

For training the model, the averaged power is computed over the first time window, as shown in the signal flow graph of FIG. 5C, for example. In FIG. 5C, power signal P is delayed in delay element 524. Current and prior power values are weighted by 0.5 and combined in adder 526 to provide averaged power value Y 528 to be used for designing the power model. This is discussed in more detail below.

Figure 6A:
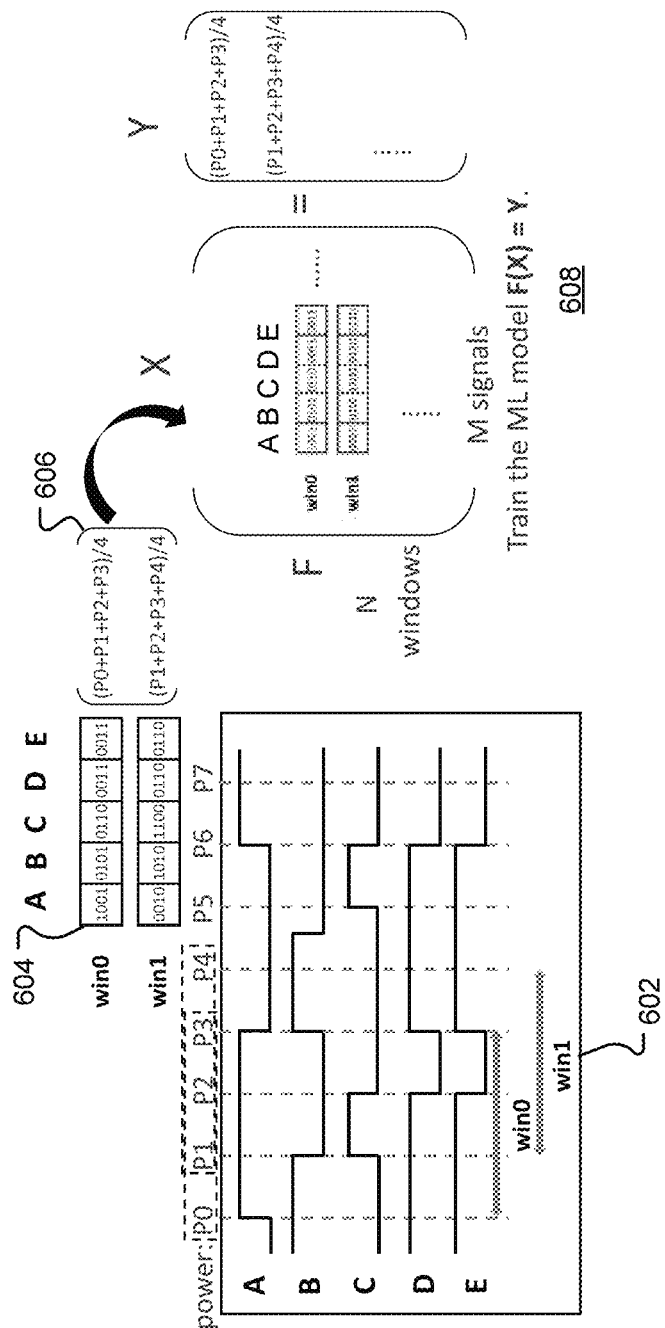
FIG. 6A shows an example of data pre-processing for power meter design using overlapping time windows, in accordance with embodiments of the disclosure.

FIG. 6A shows an example where there are no averaging is used and the power is estimated from toggle data in a window of length 4 cycles. Thus, the feature vector has four elements for each circuit node or location.

Figure 6B:
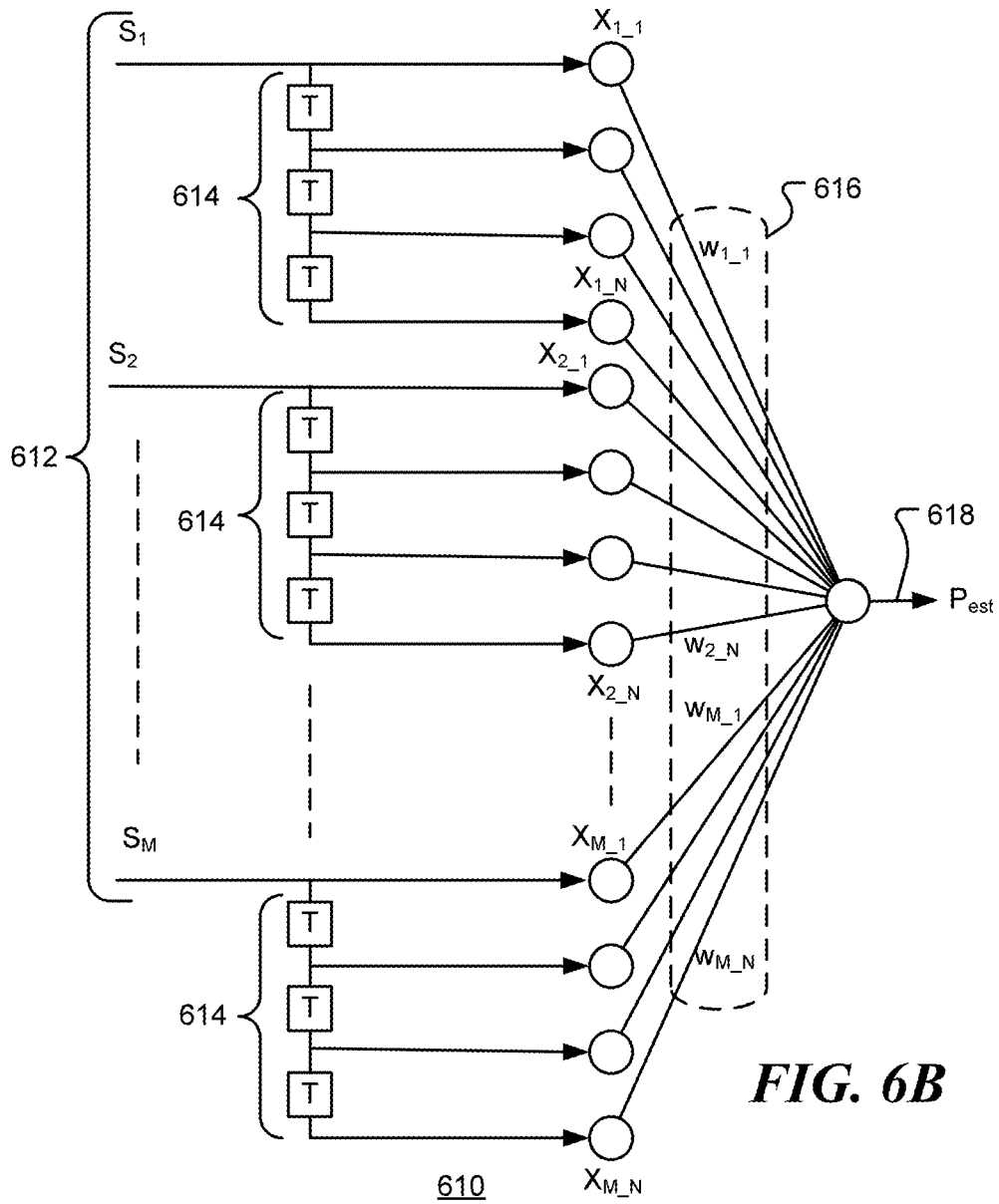
FIG. 6B and FIG. 6C show example signal flow diagrams of data pre-processing for power meter design using tapped delay lines and a moving average filter, in accordance with embodiments of the disclosure.

FIG. 6B shows a corresponding signal flow graph 610 of an embodiment of the power model. Each sequence of toggle data 612 ($S_1, S_2, \ldots, S_M$) is fed into a three element delay line 614. The toggle data from a window of length 4 clock cycles for location m provides elements ($X_{m\_1}, X_{m\_2}, X_{m\_3}, X_{m\_4}$) of the feature vector. The elements of the feature vector are weighted by weight values 616 ($W_{m\_1}, W_{m\_2}, W_{m\_3}, W_{m\_4}$) in a weighting network and summed to provide power usage estimate 618 ($P_{est}$).

Figure 6C:
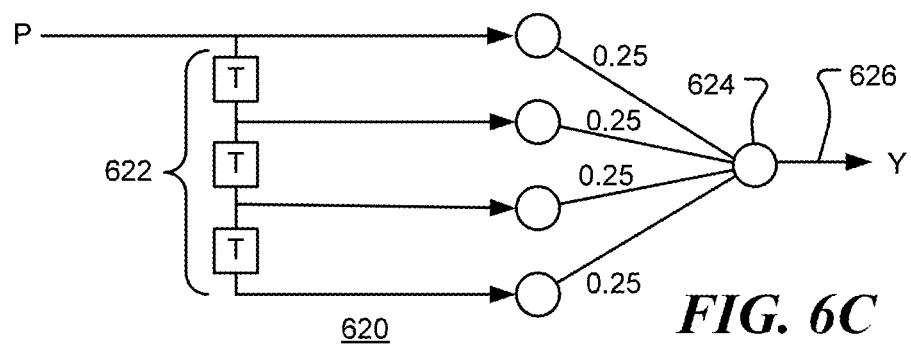

For training the model, the power is averaged over a window of the same length, as shown in the signal flow graph of FIG. 6C. In FIG. 6C, power signal P is delayed in delay line 622. Powers in the window are weighted by 0.25 and combined in adder 624 to provide averaged power value Y 626 to be used for designing the power model.

Figure 7A:
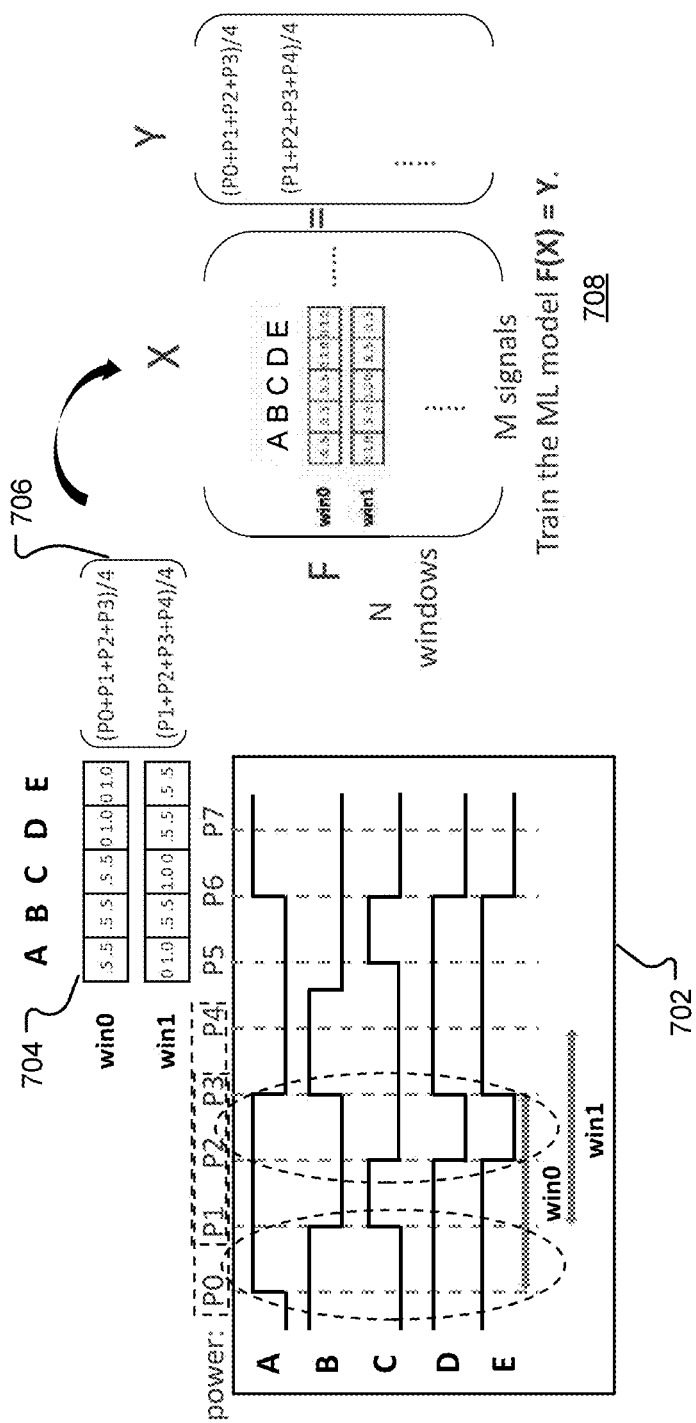
FIG. 7A shows an example of data pre-processing for power meter design using overlapping time windows and data averaging, in accordance with embodiments of the disclosure.

FIG. 7A shows an example where toggle data from windows of length 4 clock cycles is accessed (e.g. win0 and win1). Within the 4-cycle window, toggle data is averaged over two consecutive cycles, giving two averaged toggle values in each first window. In this embodiment, overlapping 4-cycle first windows are used.

Figure 7B:
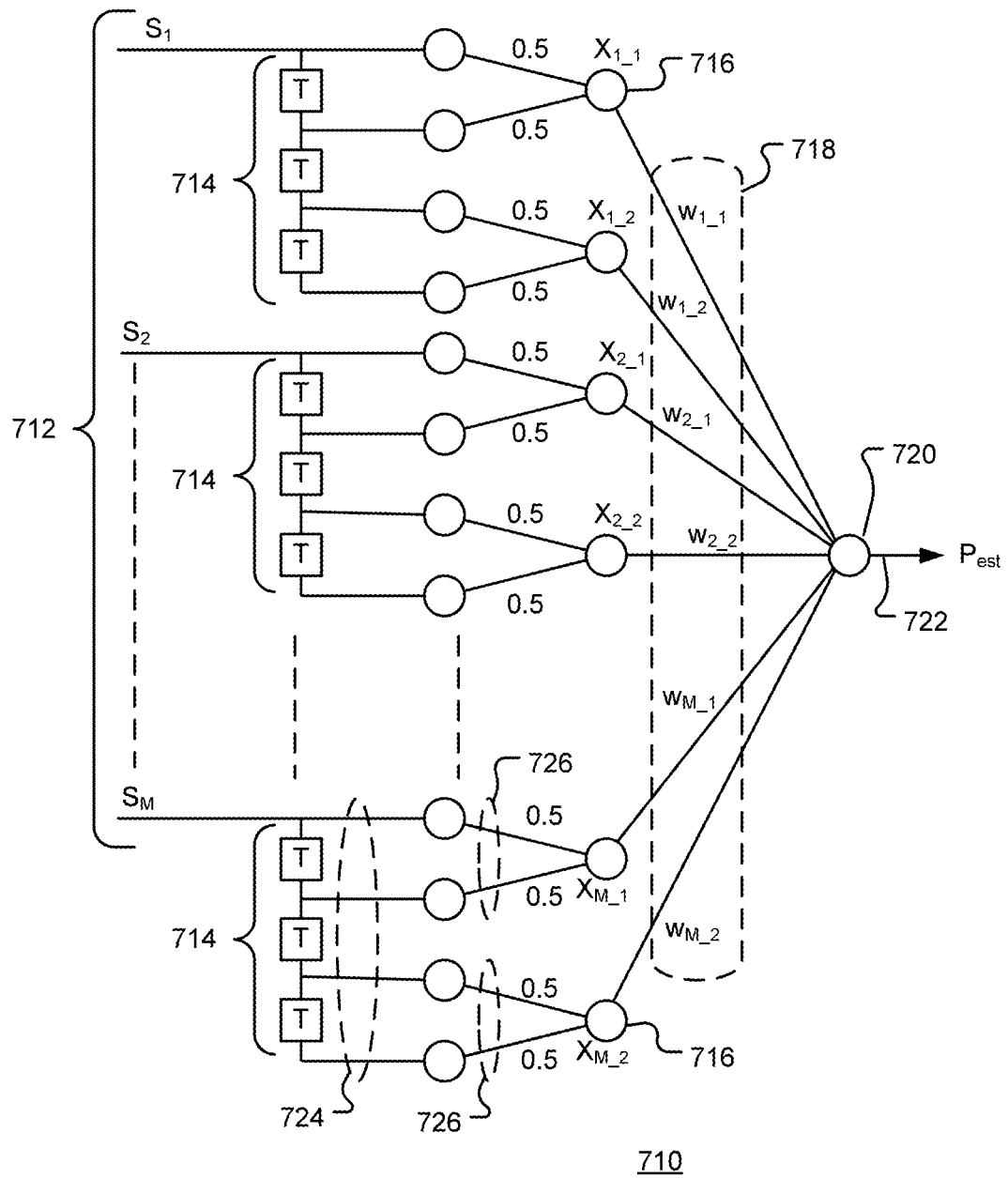
FIG. 7B and FIG. 7C show example signal flow diagrams of data pre-processing for power meter design using tapped delay lines and moving average filters, in accordance with embodiments of the disclosure.

FIG. 7B shows an example of signal flow graph 710 for this embodiment. Each sequence ($S_1, S_2, \ldots, S_M$) of toggle data 712 is fed into a three element delay line 714, scaled by 0.5 and summed at adders 716 to provide the elements ($X_{1\_1}, X_{1\_2}, X_{2\_1}, \ldots, X_{M\_1}, X_{M\_2}$) of the feature vector. The elements of the feature vector are weighted by weight values 718 ($W_{1\_1}, W_{1\_2}, W_{2\_1}, \ldots, W_{M\_1}, W_{M\_2}$) in a weighting network and summed at 720 to provide power estimate 722 ($P_{est}$). The tapped delay lines 714 provide the toggle data in a 4-cycle window 724. This data is averaged over a 2-cycle window 726.

Figure 7C:
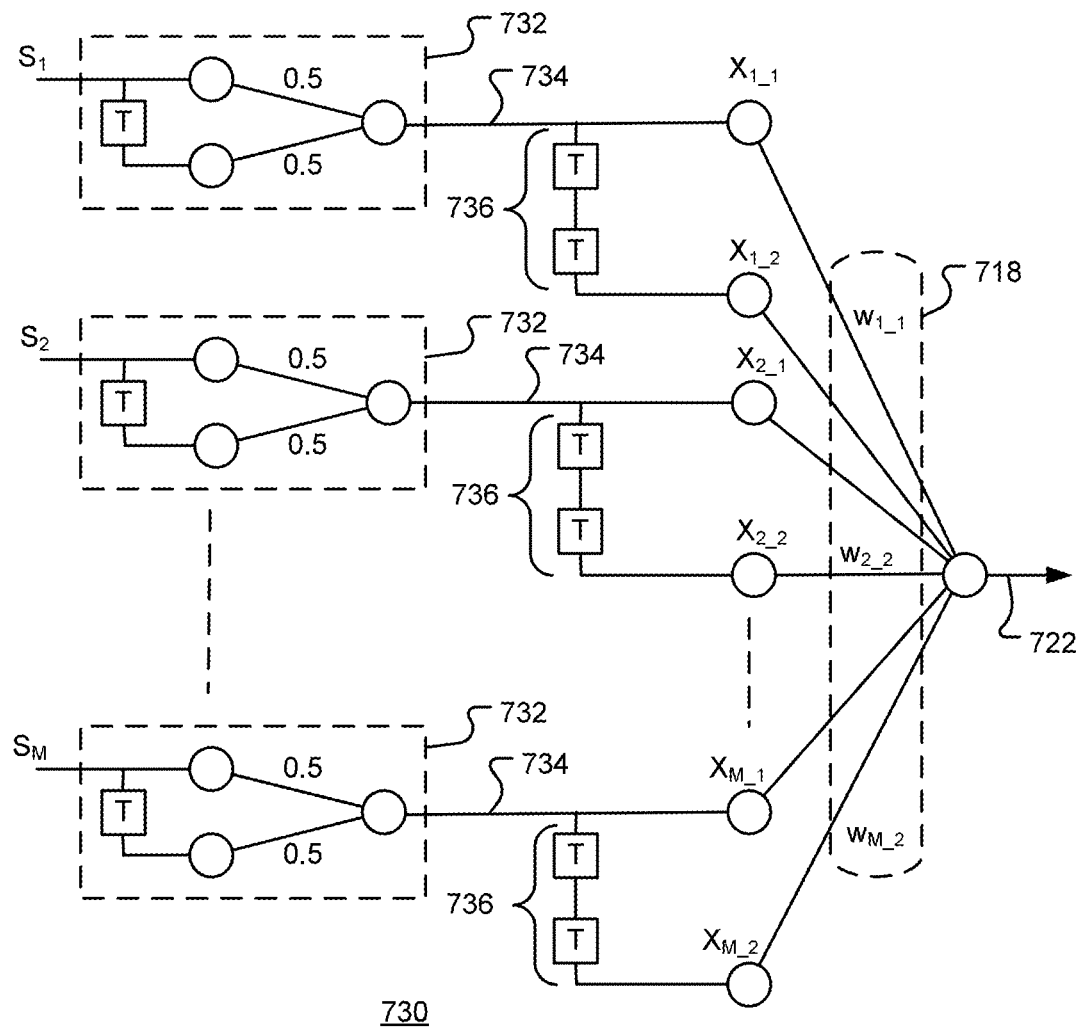

FIG. 7C shows a further signal flow graph 730 configured to perform the same function as flow graph 710. In this implementation, averaging of the toggle data over the 2-cycle window is performed first in moving average filters 732. The averaged toggle data is passed to tapped delay lines 736. The delay line is tapped at 2 locations to provide the elements ($X_{1\_1}, X_{1\_2}, X_{2\_1}, \ldots, X_{M\_1}, X_{M\_2}$) of the feature vector. As before, the elements of the feature vector are weighted by weight values 718 ($W_{1\_1}, W_{1\_2}, W_{2\_1}, \ldots, W_{M\_1}, W_{M\_2}$) and summed to provide power estimate 722 ($P_{est}$).

As described above, the M moving average filters 732 may be replaced by a single moving average filter at the output 722 when the weighting network is a linear network.

In the examples described above, toggle data in first time window is accessed and averaged over one or more second time windows within the first window, to provide elements of the feature vector. The elements are combined in a weighting network to provide a measure of power usage. The toggle data may be accessed from a store of previously recorded signal data or toggle data. Alternatively the signal or toggle data may be accessed one clock cycle at a time, for example, as generated by a simulator or emulator.

As illustrated by the above examples, the pre-processor may be configured to use any amount of data averaging and any length tapped delay lines. That is, the first time window may be configured to have any selected length and may contain one or more second time windows. These parameters may be selected by the designer. For training the power model, the target power signals are generated by passing the per-cycle power signals through corresponding moving average filters.

As will be apparent to those of ordinary skill in the art, the delay lines may be implemented by moving data between storage elements or by moving a pointer to access data at fixed locations in a buffer.

The approach enables accurate power modelling with configurable power window size and facilitates power-aware micro-architecture design and verification for different IPs, such as CPU, GPU, NPU and etc.

The per-cycle toggle pattern matrix (e.g. 406, 502, 604, 704) and per-cycle power measurement vector (e.g. 408, 504, 606, 706) may be used to calibrate a power model for user configured parameters.

Toggle data may be represented as zeros and ones, as described above, in which case the moving average filter may be implemented as a counter plus a scaling factor.

A per-cycle toggle pattern matrix may generated by concatenating the per-cycle feature vectors, while a per-cycle power measurement vector is generated by concatenating the per-cycle power measurement or the per-cycle averaged power measurements.

In one embodiment, the moving average filters are shorter than the length of the tapped delay lines.

The signal toggle pattern matrix (e.g. 406, 502, 604, 704) and power measurement vector (e.g. 408, 504, 606, 706) may be used in an iterative training process, where different variables belonging to the same signal are updated in a group manner to converge to zeros simultaneously. The training process may perform signal selection and power model calibration (weight computation) simultaneously. This is described in more detail below. The training can be performed multiple times iteratively.

The length of the moving average filters and the length of tapped delay lines define two data windows. In FIG. 5A and FIG. 6A, the user configured power measurement window is four cycle long, which corresponds to a delay line with four taps (3 delay elements), and the per-cycle toggle pattern matrix X is formed by concatenating the per-cycle toggle count within each window for each signal. Similarly, the per-cycle power measurement vector Y is generated by concatenating the per-cycle power measurement within each window. The constructed per-cycle toggle pattern matrix and power measurement vector can be further fed into a machine learning (ML) model training process to generate power models.

FIG. 7A shows that the power measurement vector can be transformed by taking the average of per-cycle power measurement window within a fixed window size ('two' in the example, corresponding to a length 2 moving average filter). This is smaller than the user configured window size for power analysis.

Model Construction

Figure 8:
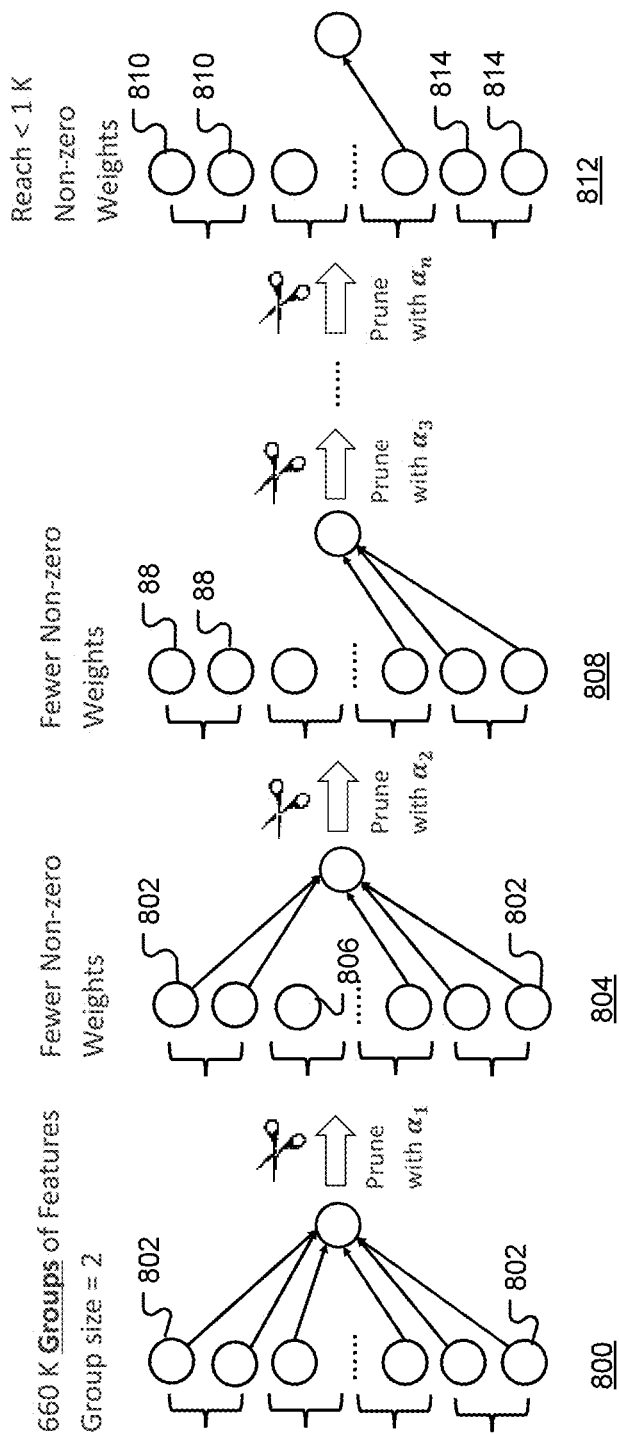
FIG. 8 is a diagrammatic representation of power model training for an example weighting network, in accordance with embodiments of the disclosure.

FIG. 8 is a diagrammatic representation of power model training for an example weighting network (such as 304 in FIG. 3A or 354 in FIG. 3B). In each cycle, the power P is computed in the network as $$P = \sum_{m=1}^{M} \sum_{n=1}^{N} w_{m\_n} \times X_{m\_n}$$

where $w_{m\_n}$ are weight values $X_{m\_n}$ are elements of a feature vector.

The training is performed in a number of iterations. In each iteration, weight values $w_{m\_n}$ are computed and signals associated with zero value weights and optionally, negative value weights, are eliminated. In the example shown in FIG. 8 the weights belonging to different delays of the same signal, e.g., two weight, $w_{1\_1}$, $w_{1\_2}$, applied to elements $X_{1\_1}$ and $X_{1\_2}$ (which are derived from the same signal $S_1$) will share the same penalty during one iteration of simultaneous signal selection and power model calibration. The procedure can be performed multiple times, iteratively, with different penalty strength, $\lambda_1, \lambda_2, \lambda_3, \ldots, \lambda_n$.

In one embodiment, the power model generator constructs an efficient maximum likelihood based (ML-based) power estimator. For a design with M RTL signals $S_M$ and N-cycles simulation traces, the input features are the N-cycle toggling activities of all M signals, and the label ($y \in R^N$) is the per-cycle power value generated from the RTL-level commercial power analysis flow.

An RTL signal is defined as a power proxy when its toggle data are used to predict power. In first stage of model construction for a design with M RTL signals, N cycles of simulation traces, and corresponding per-cycle ground-truth power, Q RTL signals are selected as power proxies and a linear power model is developed to enable per-cycle power predictions for both offline power simulation and a runtime on-chip power meter (OPM).

Among all M RTL signals, Q signals are selected as power proxies for power predictions. The power proxies are a subset of all signals, e.g., $S_Q \subseteq S_M$. Power estimators fall into two categories. The first category only minimizes the prediction error, which adopts all RTL signals as power proxies $S_Q = S_M$. The second category minimizes both the prediction error and the number of power proxies Q. These two categories as all-signal methods and selection-based methods, respectively.

By reducing power proxy number Q, the advantages of the selection-based methods are two-fold. First, it is $$\frac{M}{Q} \times \text{faster}$$

at most steps in relevant offline power simulation flow, including feature generation, feature collection, and model inference. This further makes it feasible to perform per-cycle power prediction on large-scale simulation traces. Second, with a linear power model, selection-based methods are hardware-friendly towards as a runtime OPM.

TABLE 1

Description of Frequently Used Symbols

| Symbol | Description of the symbol |
| --- | --- |
| $X_{raw}$ | Toggle data of all signals as raw features, $X_{raw} \in \{0,1\}^{N \times M}$ |
| X | Toggle data of power proxies as features, $X \in \{0,1\}^{N \times Q}$ |
| y | Per-cycle power as label, $y \in R^N$ |
| N; M | Number of cycles; Number of RTL signals in the design |
| Q | Number of selected power proxies, $Q \leq M$ |
| $S_M$; $S_Q$ | All signals len($S_M$) = M; Power proxies len($S_Q$) = Q |
| $\lambda$; $\gamma$ | Penalty strength; A hyper-parameter in MCP |
| T | Number of cycles in the measurement window, $T \geq 1$ |
| B | Number of bits in each quantized weight in APOLLO-OPM |

FIGS. 3-7, described above, show the example procedures for constructing features X and powers Y based on the design RTL and simulation traces. Per-cycle toggling activities reflect the net transition states and directly correlate with the dynamic power consumption. At each cycle, either a rising or falling edge in the simulation trace is denoted as 1 in features X, while no toggling is denoted as 0. Thus, each RTL signal contributes to one dimension in the feature vector and each cycle generates one data sample. For M RTL signals and N cycles of simulation traces, the raw input feature is the signal toggling matrix $X_{raw} \in \{0\}^{N \times M}$, and the input with only selected RTL signals as power proxies is $X \in \{0,1\}^{N \times Q}$. The label is per-cycle power consumption $y \in R^N$ measured using the commercial tool flow.

An example training process is described below. The power in cycle i is predicted as $$\text{Pred} = y_{est}^{(i)}(w_j) = \sum_{j=1}^{M} w_j * x_j^{(i)}. \tag{1}$$

For linear regression, the weights are chosen to minimize a loss function given by $$\text{Loss} = \frac{1}{N} \sum_{i=1}^{N} \left( y^{(i)} - \sum_{j=1}^{M} w_j * x_j^{(i)} \right)^2 + \sum_{j=1}^{M} P(w_j), \tag{2}$$

where the first term on the right hand side of equation (2) is the mean square error over N clock cycles and the second term is a penalty function.

In accordance with embodiments of the disclosure, various penalty functions may be used. The 'Lasso' loss function for a weight value $w_j$ is given by $$P_{lasso}(w_j) = \lambda |w_j|, \tag{3}$$

which has derivative $$|dP(w_j)/dw_j| = \lambda, \tag{3}$$

for some parameter $\lambda$.

This penalty function penalizes all weights. An alternative minimax concave penalty (MCP) function is given by $$P_{MCP}(w_j, \gamma > 0) = \begin{cases} \lambda|w_j| - \dfrac{w_j^2}{2\gamma} & \text{if } |w_j| \le \gamma\lambda \\ \dfrac{1}{2}\gamma\lambda^2 & \text{if } |w_j| > \gamma\lambda \end{cases} \quad (4)$$

This penalty function leaves large weights 'unpenalized'.

The power meter design starts with power proxy selection by constructing a sparse linear model and pruning features with zero weights and optionally, negative weights. After that, only signals with positive weights are selected as power proxies $S_Q$. The selection step is followed by a relaxation step to perform ridge regression with a weak penalty to generate the power model with $S_Q$.

The sparse linear model may be constructed by applying regularizers such as a Lasso regularizer, which shrinks all weights at the same rate, where the weight shrinking rate is quantified by the absolute derivative of the penalty term. However, to achieve a high sparsity ratio on the weights, when the small weights shrink to zeros and are pruned away, large weights may be penalized too much to provide accurate power predictions.

Figure 9:
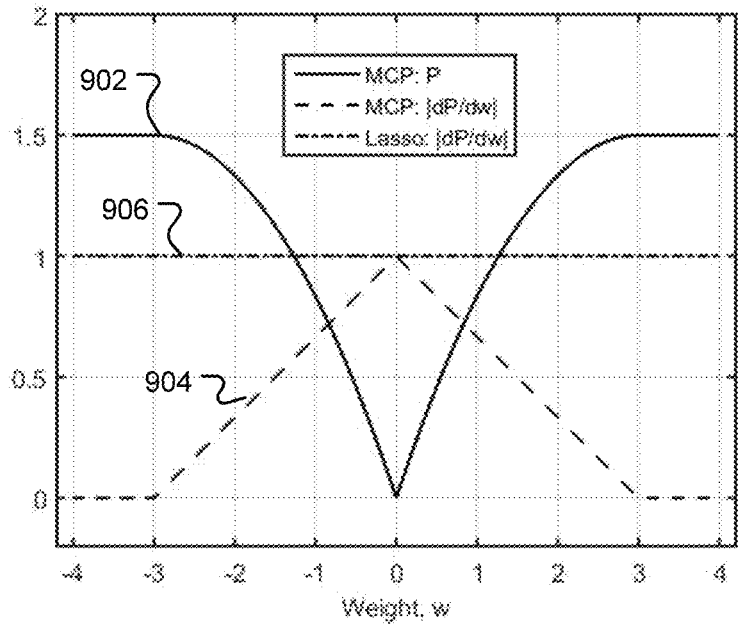
FIG. 9 shows graphs of penalty terms and a derivative of a penalty terms, in accordance with embodiments of the disclosure.

To overcome the aforementioned limitation, the power model may be constructed using a minimax concave penalty (MCP) metho, as described above. The loss function in equation (5) below consists of the prediction error ($\mathcal{L}$) and the penalty term ($\mathcal{R}$). $\lambda$ controls the regularization strength. The hyper-parameter $\gamma$ in MCP regularizer sets the threshold ($\gamma\lambda$) between large and small weights. FIG. 9 shows a graph 900 of the derivatives of the penalty terms $P_{Lasso}$ (902) and $P_{MCP}$ (904) with $\lambda=1$ and $\gamma=3$. If the absolute derivatives of both penalty terms are measured, which indicate the regularizer-induced shrinking rate, the absolute derivative of $P_{Lasso}$ is $\lambda$, which is the same for all non-zero weights. In contrast, for MCP, large weights with values>$\gamma\lambda$ do not shrink because the derivative of the penalty term is zero. Therefore, MCP leaves large weights unpenalized, which benefits the prediction accuracy of the generated power model.

$$\text{Loss} = \mathcal{L} + \mathcal{R} = \sum_{i=1}^{N}\left(y^{(i)} - \sum_{j=1}^{M} w_j * x_j^{(i)}\right)^2 + \sum_{j=1}^{M} P(w_j) \quad (5)$$

$$P_{Lasso}(w_j) = \lambda|w_j| \quad (6)$$

$$P_{MCP}(w_j, \gamma > 0) = \begin{cases} \lambda|w_j| - \dfrac{w_j^2}{2\gamma} & \text{if } |w_j| \le \gamma\lambda \\ \dfrac{1}{2}\gamma\lambda^2 & \text{if } |w_j| > \gamma\lambda \end{cases} \quad (7)$$

The MCP model may be optimized using the coordinate descent method, which converges much faster than the gradient descent method in the disclosed procedure. During training, the weights are constrained to be non-negative. By doing this, the runtime OPM implementation does not require a sign bit to represent the model weights. The penalty strength $\lambda$ is adjusted to control the weight sparsity ratio and the corresponding power proxy number Q. After power proxy selection with MCP regression, to further boost the model accuracy, a new linear model is trained from scratch using only the selected power proxies $S_Q$. For this new linear model, an L2 regularizer, such as a Ridge regularizer, is applied, with a weaker penalty strength compared to the $\lambda$ used in the MCP regression. This step is referred to as relaxation and generates the final power model. In the previous power proxy selection step, the penalty term $\mathcal{R}$ dominates the loss, and the prediction error $\mathcal{L}$ is less optimized. The relaxation can be viewed as a fine-tuning stage to improve the optimization of $\mathcal{L}$. All weights are still constrained to be positive. $\mathcal{L}$ Large Scale Circuits/Workflows The traditional commercial power analysis flow based on electronic design automation (EDA) tools is highly time-consuming, especially at the power analysis stage. In contrast, the present disclosure enables fast offline power simulation, by integrating the power model into the power analysis flow. Based on toggle data from selected power proxies ($S_Q$), the power model infers millions-of-cycles power values within seconds. This greatly accelerates power predictions on the power-indicative micro-benchmarks when RTL simulation is affordable in terms of speed.

However, for large-scale benchmarks, the RTL simulation process becomes the speed bottleneck. To further scale the flow to those large-scale benchmarks, an emulation framework may be used in pace of the RTL simulation.

In the emulator framework, large-scale benchmarks are emulated on the design RTL within minutes using the special-purpose hardware. Since the disclosed power model only relies on a small subset of the RTL signals as power proxies, it is possible to only save the toggle data of Q power proxies and enable fast power inference on large-scale power-indicative benchmarks. Compared to the saving the toggling activities of all RTL signals, the size of simulation traces is approximately $$\frac{M}{Q} \times \text{smaller,}$$

which also leads to much lower file input/output overhead.

Figure 10:
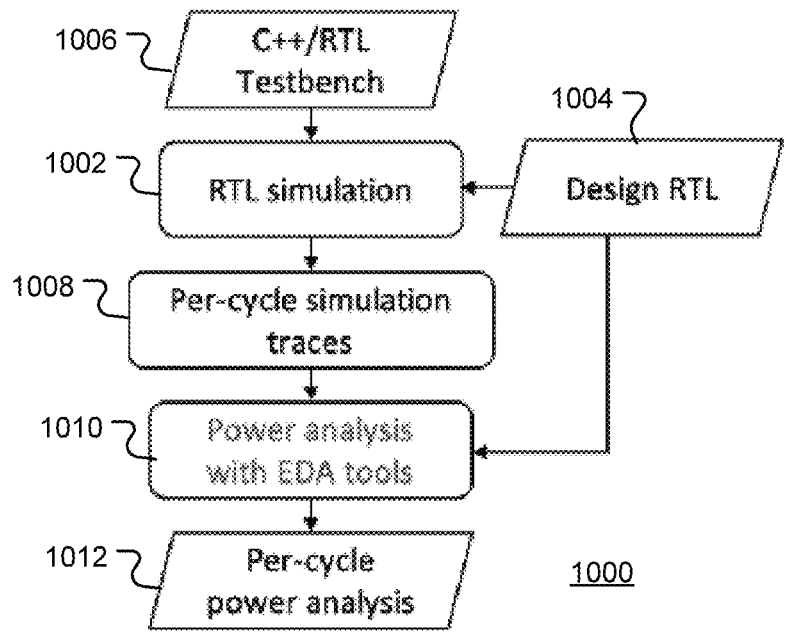
FIG. 10 shows a conventional EDA flow for RTL simulation and power analysis.

FIG. 10 shows a flow chart 1000 for a conventional flow from an Electronic Design Automation (EDA) tool for RTL simulation and power analysis. In this example, an RTL simulation 1002 of an RTL design 1004 is performed using a C++/RTL test-bench 1006. The simulation produces per-cycle simulation traces 1008 for each circuit node. Power analysis is then performed at 1010 to provide a per-cycle power analysis 1012. The per-cycle simulation traces 1008 and the corresponding per-cycle power analysis 1012 may be used to design the power, as described above.

Figure 11:
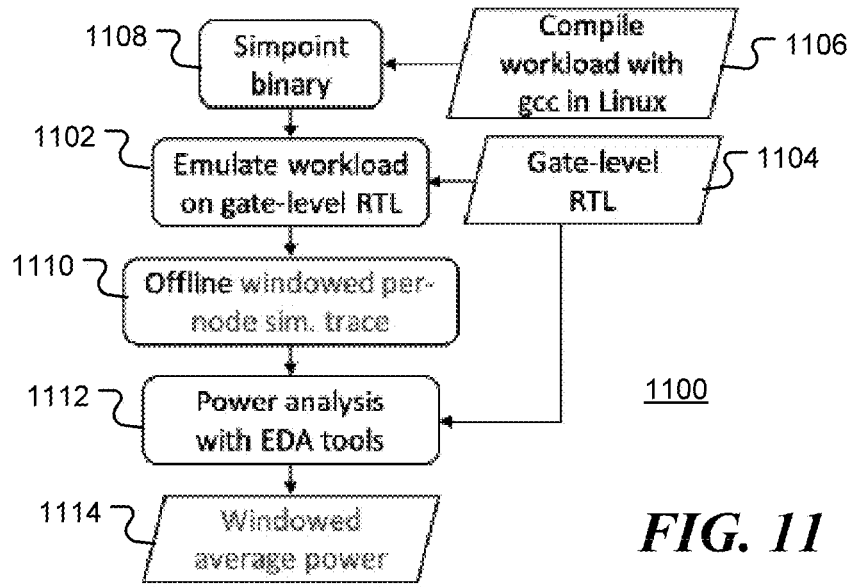
FIG. 11 show an emulator-driven power flow (EDPF) for windowed average power analysis, in accordance with embodiments of the disclosure.

FIG. 11 show an emulator-driven power flow (EDPF) 1100 for windowed average power analysis. In this example, signals are computed by emulating a workload on a structural RTL at 1102. The circuit is defined by gate-level RTL 1104. A workload is compiled at 1106 and converted into binary code for the emulator at 1108. Windowed traces for each node are computed at 1110 and a power analysis is performed at 1112, using EDA tools, to determine the average power 1114.

Figure 12:
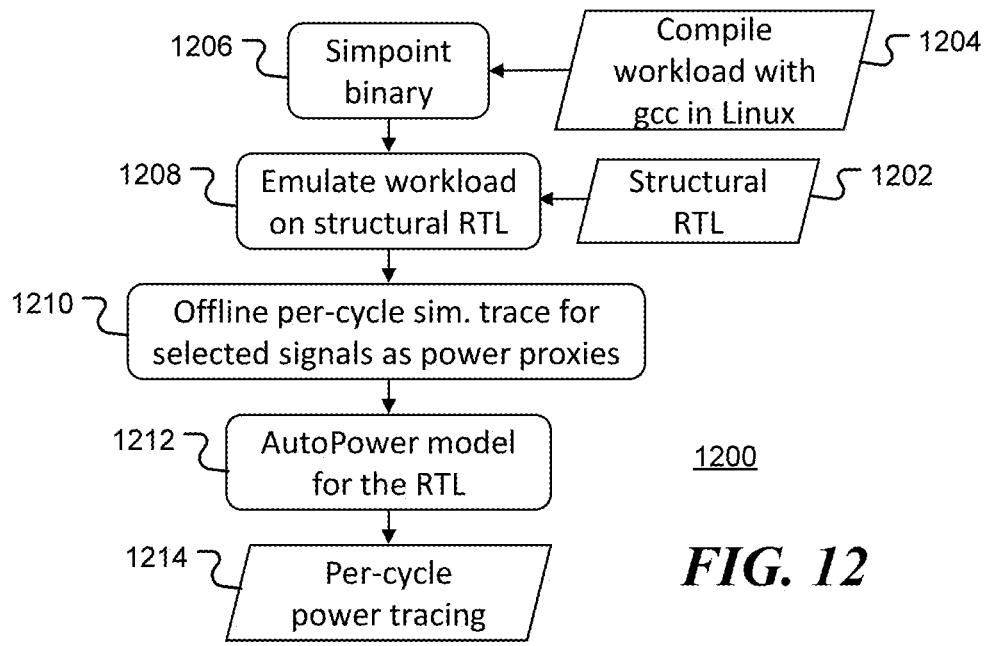
FIG. 12 shows an embodiment of the power analysis flow, in accordance with embodiments of the disclosure.

FIG. 12 shows an embodiment of the proposed flow 1200. First, binary code is generated from design RTL 1202 and workload (1204, 1206) and run on an emulator 1208. Per-cycle simulation traces for selected signals are extracted as power proxies and saved at 1210 for processing offline at a later time. For example, the power proxies may comprise a few hundred RTL signals, although fewer proxies may be depending upon the complexity of the circuit. The selected per-cycle simulation traces for selected signals are fed into the power model 1212, to generate per-cycle power tracing 1214.

Figure 13:
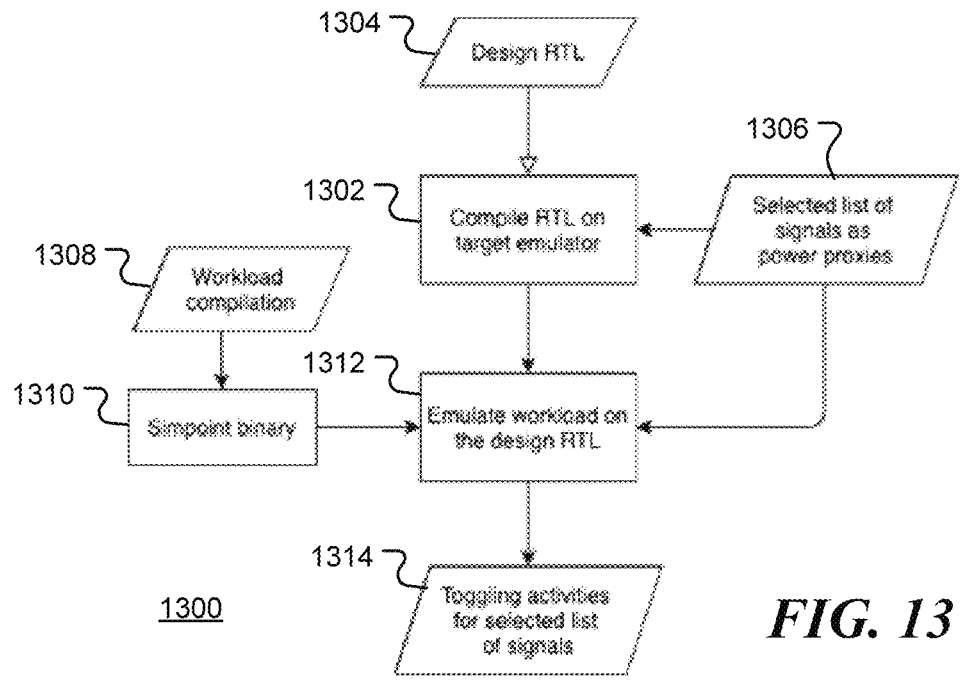
FIG. 13 shows an embodiment of emulator flow setup to provide per-cycle simulation traces for selected signals as power proxies, in accordance with embodiments of the disclosure.

FIG. 13 shows an embodiment of emulator flow 1300 to record or 'offline' per-cycle simulation traces for selected signals as power proxies, in accordance with embodiments of the disclosure. RTL is compiled on a target emulator at 1302 using design RTL 1304 and a list of the signals 1306 selected as power proxies. Workload 1308 is compiled into binary code at 1310. Execution of the workflow is emulated on the design RTL at 1312 to provide toggle activities (toggle data) for the selected signals only. The toggling activities may be used with a designed power meter to estimate per-cycle power usage by the circuit while performing the workload. Compared to prior approaches, in which all signals are recorded, this approach enables per-cycle power usage to be estimated for much larger workflows.

While the power model discussed above enables highly efficient offline power analysis flow, the application scenarios of runtime OPM may use coarse-granularity power estimations over multi-cycle power measurement windows.

Denoting the window size as T cycles, one embodiment of the disclosure takes the average of power predictions over the T cycles. However, this tends to accumulate the possible bias in the per-cycle model and fails to capture inter-cycle correlations among selected power proxies. To better exploit the property of this problem, the model may be trained based on both averaged toggle data $X_T \in \mathcal{R}^{(N-T+1) \times Q}$ and averaged power $y_T \in \mathcal{R}^{(N-T+1)}$ over all T-cycle windows in the training data. Note that there are N–T+1 overlapped T-cycle windows among N cycles. The procedure is:

(a) For $\forall$ window index $i \in [1, N-T+1]$, generate moving averages:

$$y_T[i] = \frac{1}{T}\sum_{j=i}^{i+T-1} y[j], X_T[i] = \frac{1}{T}\sum_{j=i}^{i+T-1} X[j], (X[j] \in \{0, 1\}^Q)$$

(b) Train model $\mathcal{F}_T$ with $X_T$, $y_T$
(c) Inference:

$$y_T[i] = \frac{1}{T}\sum_{j=1}^{i+T-1} y[j],$$

$$X_T[i] = \frac{1}{T}\sum_{j=1}^{i+T-1} X[j],$$

$$(X[j] \in \{0, 1\}^Q)$$

The terms $y_T[i]$ and $X_T[i]$ correspond to the outputs from moving average filters, discussed above. After training, the inference process of the power meter is implemented on a runtime OPM, which is optimized to be hardware-friendly with multiple strategies, or in software for off-line/design-time use.

In one embodiment, the averaged toggling activities $X_T$, are processed directly in the trained model. In a further embodiment, the trained model $\mathcal{F}_T$ is first applied to the toggle data at each cycle X[j], then the summation of outputs are averaged over these T cycles. Since $X[j] \in \{0,1\}^Q$, the OPM can be implemented without multipliers for any T. In addition, we set $T=2^k$ ($\kappa \in \mathcal{N}$) such that the 1/T division operation can be directly implemented by a shifter.

As described above, the per signal toggling activity and measured power consumption can be collected at a performance modelling stage, an RTL implementation stage, a gate implementation stage etc. and a power model can be calibrated by using a subset of the signal toggle data or all of signal toggle data. In a process of simultaneous signal selection and power model calibration, regression with regularization is performed to remove corresponding signal features with zero weights and optionally negative weights. A variety of regression approaches may be used, such as Lasso regression and minimax concave penalty regression.

The simultaneous signal selection and power model calibration can be performed multiple times iteratively. After the simultaneous signal selection and power model calibration, the proposed flow is compatible with additional regression steps, such as ridge regression to enhance the power model accuracy.

In one embodiment, a linear model is adopted with various regularization or penalty methods. During the iterative regression procedure, the weights are penalized and the signals or features with zeros weights are removed. For example, the Lasso regression penalizes all weights equally, while the minimax concave penalty regression leaves large weight un-penalized—focusing on penalizing the small weights, which generate smaller subset of signals selected and/or better model accuracy. However, the disclosed approach can be generalized to a non-linear power model.

Figure 14:
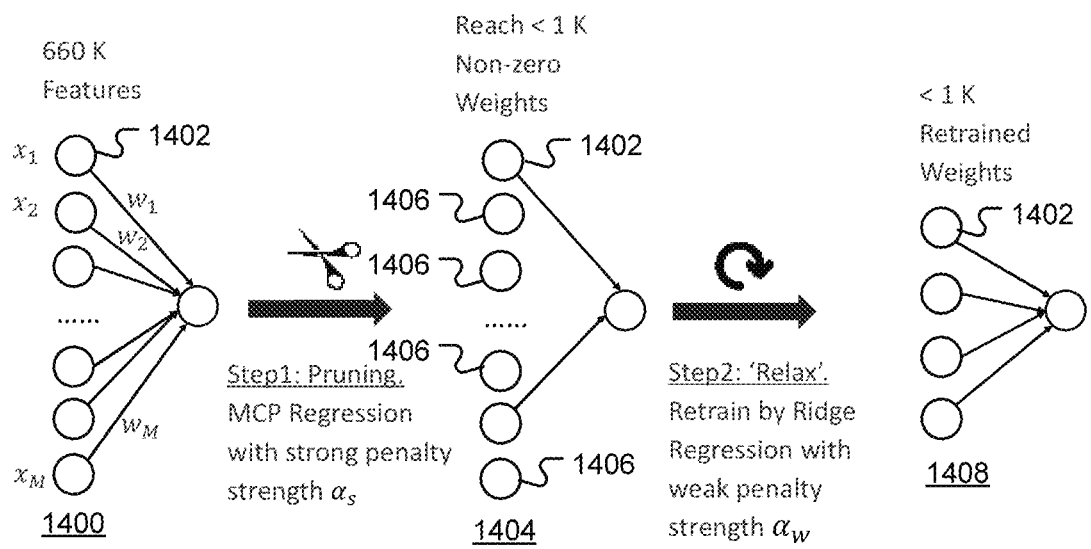
FIG. 14 illustrates an embodiment of a training process, in accordance with embodiments of the disclosure.

FIG. 14 illustrates an embodiment showing that, after the simultaneous signal selection and model training, the proposed flow can add an extra regression step to "relax" the model by relaxing the constraint on the weights. This step uses selected signals to further enhance the model accuracy. The extra step can use any regression method, such as ridge regression. As discussed above, the simultaneous signal selection and power model calibration can be performed iteratively for multiple times, with different penalty strengths, $\alpha_1, \alpha_2, \alpha_3, \ldots, \alpha_n$.

In one test, it took approximately 8 hours to estimate 100 cycles of power usage using a commercial software tool. Using the disclosed method, with selected signals as power proxies, trillions of cycles of power usage could be computed within one hour using traces from an RTL simulation. The per-signal toggle data and measured power consumption can be collected from any machine generated or hand-crafted benchmarks on the target design.

The power meter disclosed above uses a unified power modeling method that addresses both offline/design-time power simulation and runtime power monitoring. A subset of available RTL signals are selected as proxies. The subset may contain fewer than 0.1% RTL of the available signals. However, in tests, per-cycle offline simulation of a processor achieves more than 95% accuracy in the per-cycle power measure. The power meter also enables fast inference on large-scale benchmarks, while for the runtime power monitoring, the power meter may be synthesized into an efficient runtime OPM with negligible area compared to the primary digital circuit.

Experimental Results

Previous ML-based power models mainly adopt two types of training data: 1) random stimulus, 2) handcrafted ISA tests or micro-benchmarks. However, for 1), previous studies lack details on how to generate a large number of random stimulus with enough diversities for an arbitrary design. For 2), it takes lots of manual effort, engineering know-how, and expert knowledge of a specific design to generate a diverse training set. To address these practical challenges, the disclosed power meter may use automated generation of random micro-benchmarks as training data. In addition, the underlying open-source framework is based on the genetic algorithm to enable auto-generation of the micro-benchmarks across a wide range of power consumption. This framework starts with an initial population of random micro-benchmarks as "parents", which cover relatively low-power consumption ranges. For each iteration, "parents" are mutated to create "children". The average power consumption of all "children" are measured using a software tool such as 'PowerPro' and the ones with top power consumption are selected as "parents" for the next generation. Through the iterative process within about 4 days, more than 1,000 generated random micro-benchmarks cover a wide range of average power consumption, based on which around 300 micro-benchmarks are selected uniformly to form the training set.

The type of micro-benchmarks used in training and testing are kept strictly different and separate. While the training data is generated automatically, the testing data is collected from 10 different power-indicative handcrafted micro-benchmarks, including "dhrystone" and "max_power". The simulation traces N for training and testing is around 30,000 and 15,000 cycles on Neoverse N1. Based on the training data, 20% of samples are selected to form a validation set for parameter tuning. All reported accuracy values are measured on the testing data. With two cores of Intel Xeon Gold 6248 and 80 GB RAM, the commercial flow simulates 20 cycles of power as the label each hour. With 20 jobs running in parallel, all labels of Neoverse N1 are generated in 5 days. While this entire data generation process seems expensive, the trained model predicts power for millions of cycles in seconds and can be directly synthesized as a runtime OPM.

All experiments were performed on an Arm Neoverse N1, with RTL signal number $M>5\times10^5$. To verify the robustness of the power model on different designs, the power meter was also tested on an Arm Cortex-A77, with RTL signal number $M>1\times10^6$. Similarly, 5,000 cycles training data and 2,000 cycles testing data are generated for Cortex-A77.

For the same method, if hyper-parameter settings show close performance on the validation set, we prefer the simpler model, indicating less overfitting. The final reported accuracy is measured on the testing data.

The RTL simulation is performed using VCS and the ground-truth power is simulated by PowerPro based on a commercial 7 nm technology setup. The emulation is performed on Palladium Z1 emulation platform. All ML models are implemented with Python v3.7. Among the baseline methods, CNN-based models are based on Pytorch v1.5, and XGBoost models are built with xgboost-v1.30. Other methods are implemented with scikit-learn v0.22. The power meter was generated using the implement the MCP regressor and the coordinate descent algorithm using NumPy. For models with different regularization strength $\lambda$, the threshold of unpenalized weights is set to $\gamma=10$. The MCP model converges within 200 iterations.

TABLE 2

Comparisons among various power modeling approaches.

|  | Prior Approach I K-means | Prior Approach II | Power Meter |
|---|---|---|---|
| Pre-processing | Polynomial | PCA / | MCP |
| ML regression model | Elastic Net | * CNN MLP | Ridge |
| Automated training data collection |  |  | ✓ |
| Per-cycle power |  | ✓ | ✓ |
| Selection-based method | ✓ |  | ✓ |
| Hardware prototype | ✓ |  | ✓ |

Table 2 compares the disclosed power meter with two prior approaches. Approach I (D. Kim et al., "Simmani: Runtime Power Modeling for Arbitrary RTL with Automatic Signal Selection," in *MICRO*, 2019), is a selection-based method and targeting at hardware prototype using FPGAs in which signals are clustered with K-means algorithm and power proxies are selected from different clusters. After that, toggling activities of both the Q power proxies and the $Q^2$ $2^{nd}$ order polynomial terms are adopted as the model features. The adopted elastic net model is a linear model with both Lasso and Ridge regularizers, where the power measurement window size is a hyperparameter tuned to improve model accuracy. For approach II (Y. Zhou et al., "PRIMAL: Power Inference using Machine Learning," in *DAC*, 2019) several all-signal methods, including Principal Component Analysis (PCA) with various ML models, CNN, and multi-layer perceptron (MLP) are used. Note that, although PCA performs dimension reduction, it still requires all register signals as its initial input for power predictions, which is fundamentally different from the power proxy selection method proposed in the disclosed power meter. Besides aforementioned baseline methods, Lasso regression is also included as the most widely-used sparsity-induced algorithm.

The final reported accuracy is measured on the testing data and metrics include the normalized root-mean-squared-error (NRMSE) and the coefficient of determination ($R^2$) score.

$$NRMSE(y, p) = \frac{1}{\bar{y}} \sqrt{\frac{\sum_{i=1}^{N}(y[i]-p[i])^2}{N}}.$$

$$R^2(y, p) = 1 - \frac{\sum_{i=1}^{N}(y[i]-p[i])^2}{\sum_{i=1}^{N}(y[i]-\bar{y})^2}, \text{ where } \bar{y} = \frac{1}{N}\sum_{i=1}^{N}(y[i]).$$

Figure 15:
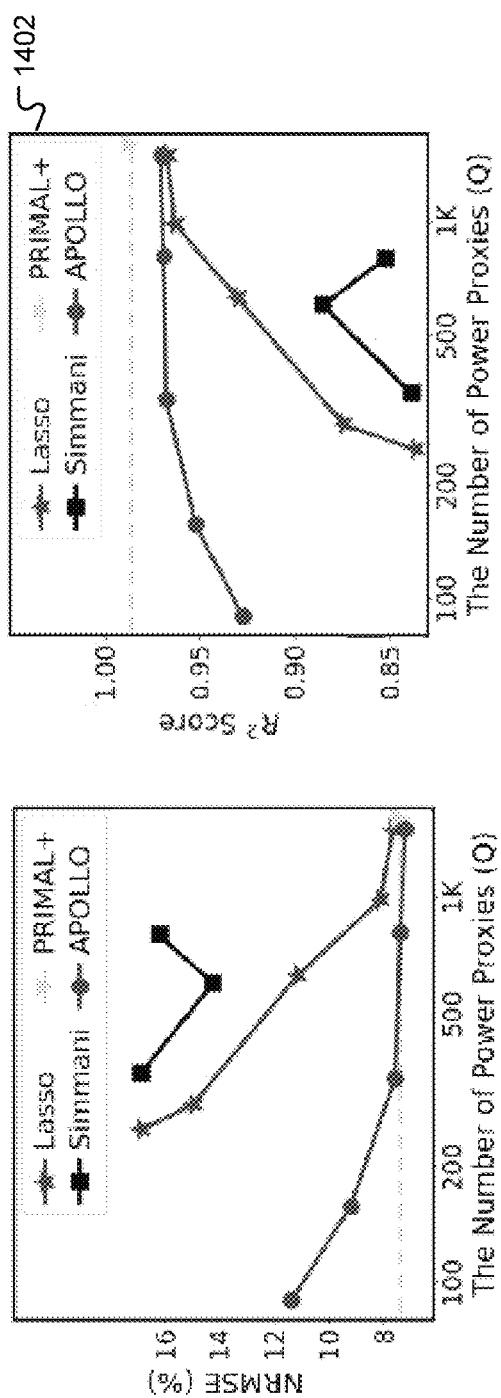
FIGS. 15-20 show example results, in accordance with embodiments of the disclosure.

For per-cycle power prediction, the disclosed power meter is compared with baseline methods in FIG. 15. This figure shows the trade-off between Q and corresponding accuracy on Neoverse N1. For all-signal methods in PRIMAL, the CNN model performs much better than PCA and MLP in our dataset, which is also consistent with prior results in. Thus only PRIMAL-CNN's performance is reported. It is represented by a horizontal line since its Q=M. The disclosed power meter, referred to as APOLLO achieves NRMSE<11% and $R^2>0.92$ with power proxy number Q<100, which is less than 0.02% of total RTL signals. It shows similar NRMSE compared with CNN with Q=500. In contrast, the NRMSE for all other selection-based baselines is higher than 12% even with Q=500.

Figure 16:
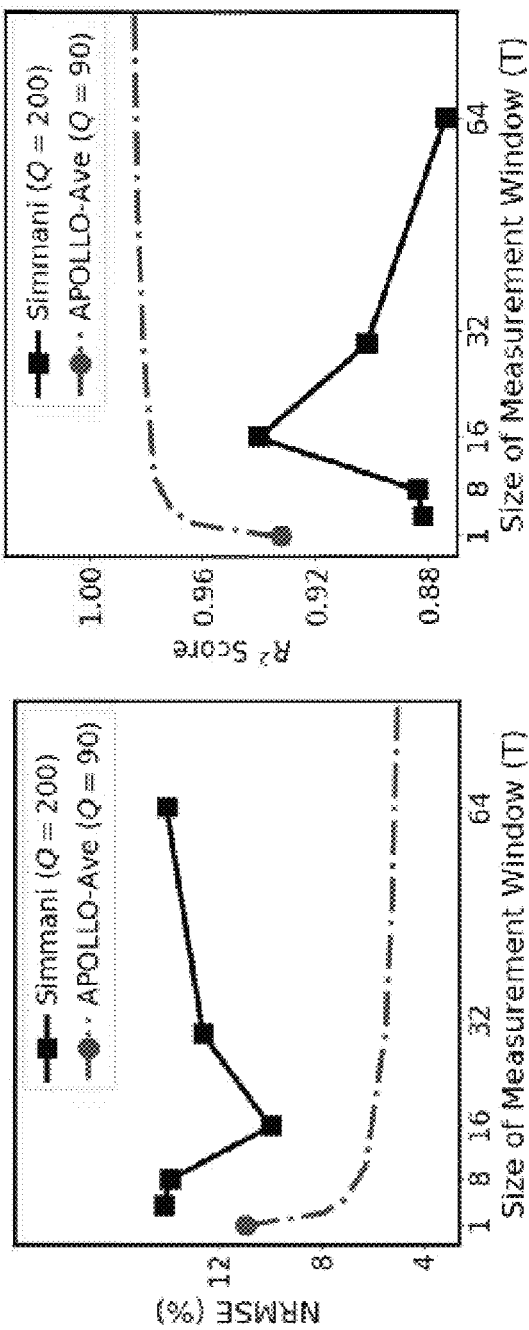

Since approach I applies to various measurement window sizes, FIG. 16 compares the performance in estimating the average power over measurement windows with T cycles. Different Simmani models are trained for T={2,4,8,16,32,64}. The prediction of the disclosed power meter is the simple average over T per-cycle predictions. In FIG. 16, APOLLO is 4% higher in $R^2$ for all T values by adopting only 90 power proxies, which is less than half of the Simmani model.

Figure 17:
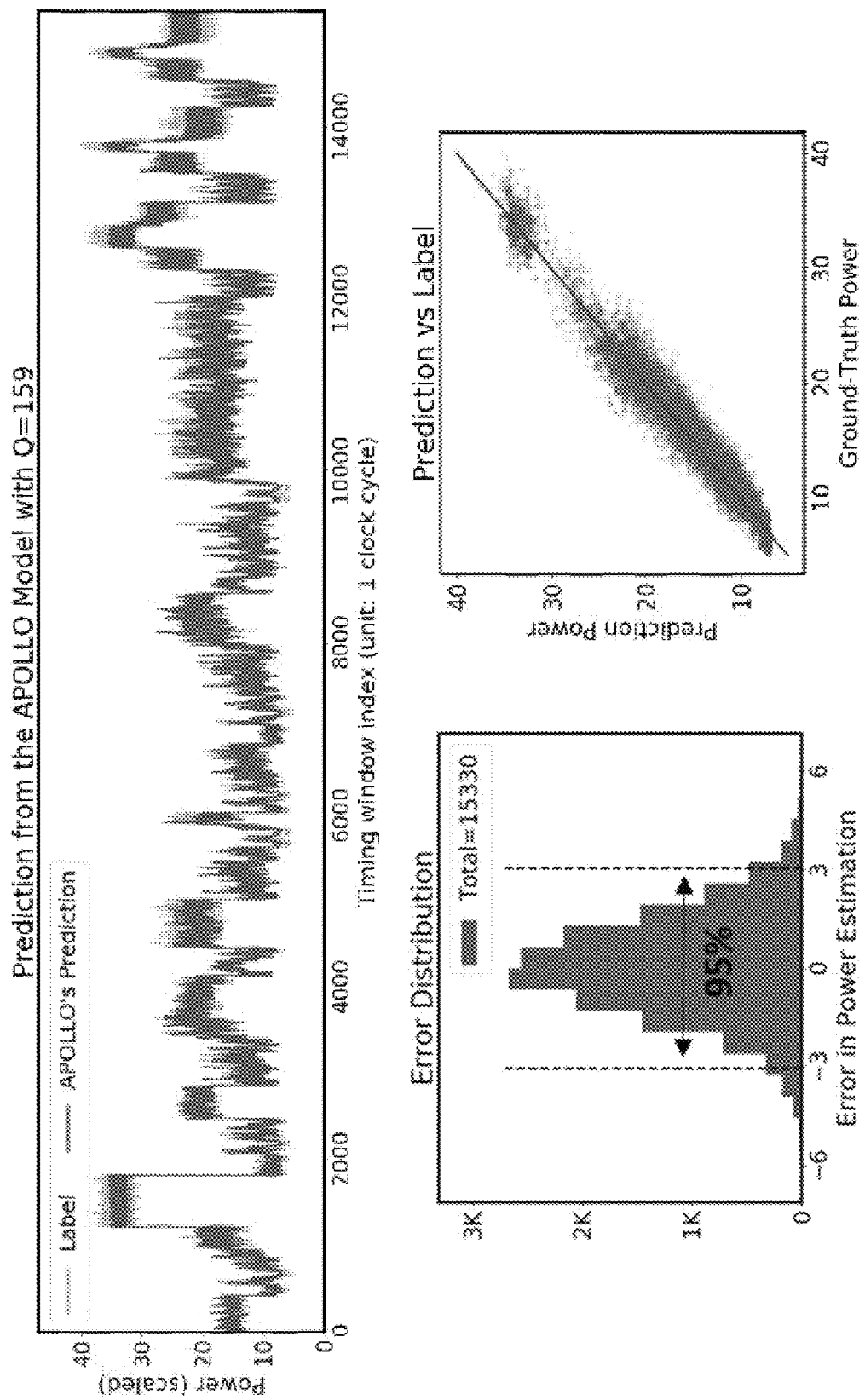

A detailed evaluation of the disclosed power meter was performed for a model with Q=159, which obtains NRMSE=9.41% and $R^2=0.95$. FIG. 17 illustrates prediction p and label y as waveforms on the 15,000-cycle testing dataset. Though these testing data comes from 10 different handcrafted micro-benchmarks with distinctive patterns, prediction for the disclosed power meter overlaps well with the ground truth. The error distribution histogram in FIG. 17 shows the corresponding distribution of error |y−p|. The absolute error follows the Gaussian distribution approximately and is within 3σ for approximately 95% of samples. FIG. 17 also provides a scatter plot between prediction p and label y, showing the tightly controlled errors.

Figure 18A:
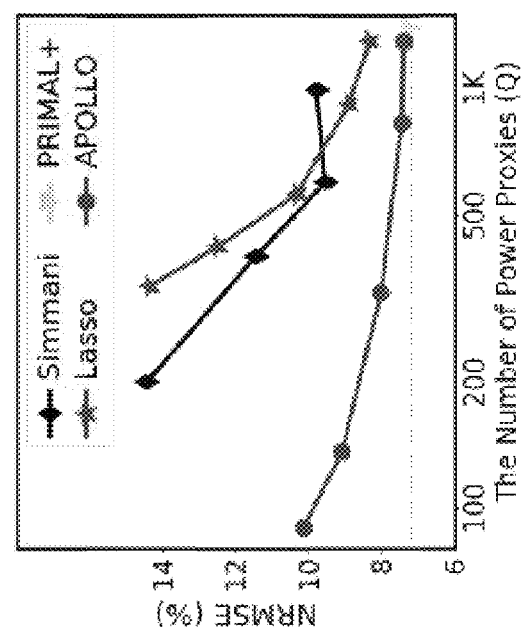
Figure 18B:
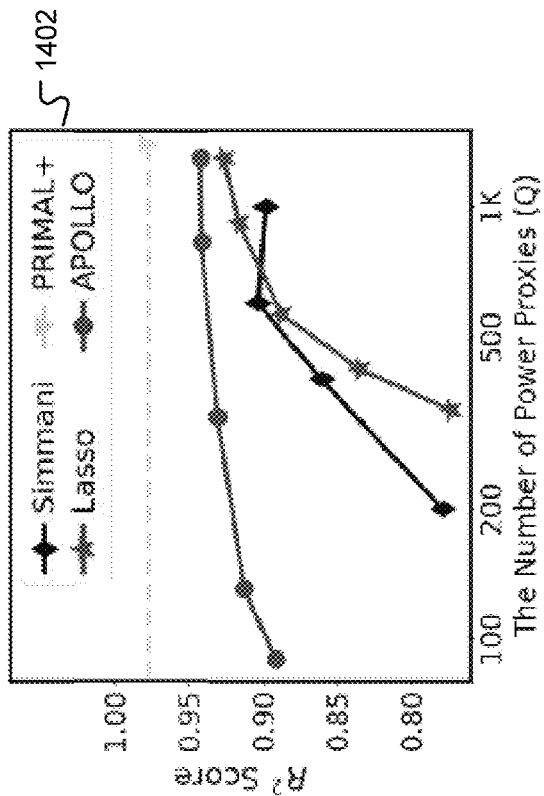

To verify that the power meter generalizes well on different designs, the accuracy of the meter on a Cortex-A77 processor was measured. The comparison of NRMSE and $R^2$ is shown in FIG. 18. The disclosed power meter (APOLLO) achieves better trade-off between accuracy and Q than all other selection-based methods, and obtains comparable NRMSE with CNN when Q>500. This verifies the robustness of APOLLO across different designs.

APOLLO-Integrated EBPF

Figure 19:
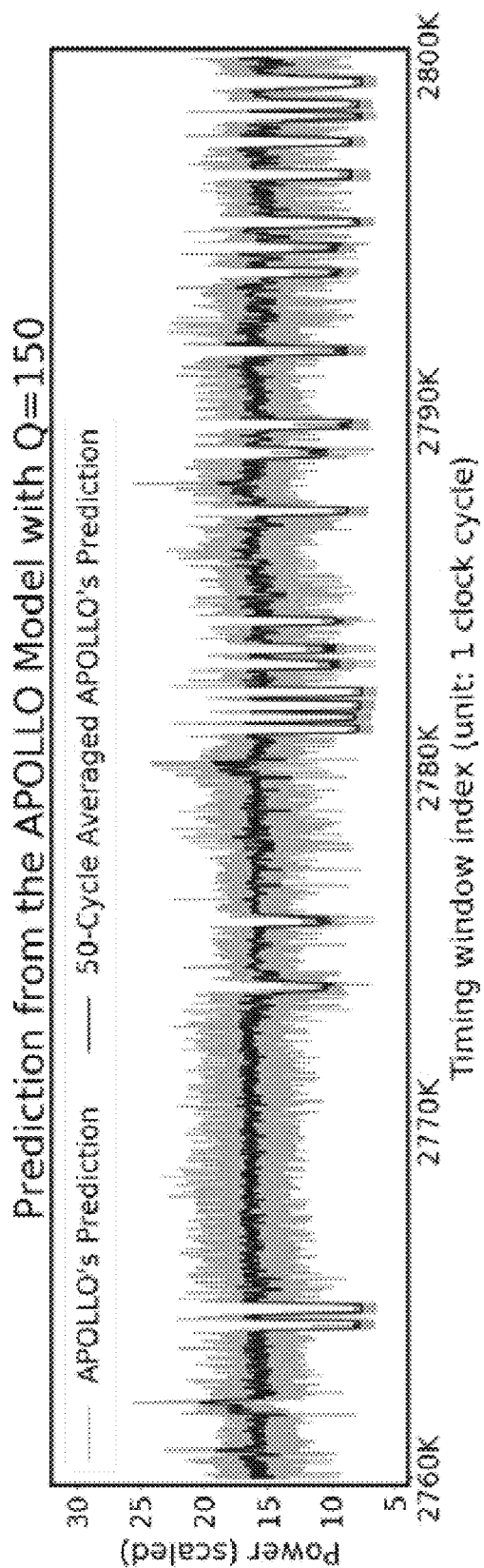

APOLLO-integrated EBPF enables fast and high-fidelity power predictions on large-scale benchmarks. By only including the toggling activities of Q=150 power proxies, the size of a simulation trace with N=17 million cycles is only 1.1 GB. This trace is generated by emulation within three minutes. After the input matrix X is generated based on the signal traces, APOLLO finishes the inference within seconds. FIG. 19 visualizes a small portion of the prediction result, which spans across 40,000 cycles. Considering the speed limit, it is impossible to measure the per-cycle power of the trace within a reasonable amount of time using the traditional flow. To validate the per-cycle prediction from APOLLO, we measure the ground-truth average power of this whole interval using the PowerPro. The difference between the average of APOLLO prediction and the ground-truth measurement is within 10%.

Speed Comparison

TABLE 3

Training Time

| Models | Time (hour) |
|---|---|
| PCA | 1 |
| K-means | 0.2 |
| MLP | 8 |
| CNN | 3 |
| Lasso | 0.5 |
| APOLLO | 1.5 |

Figure 20:
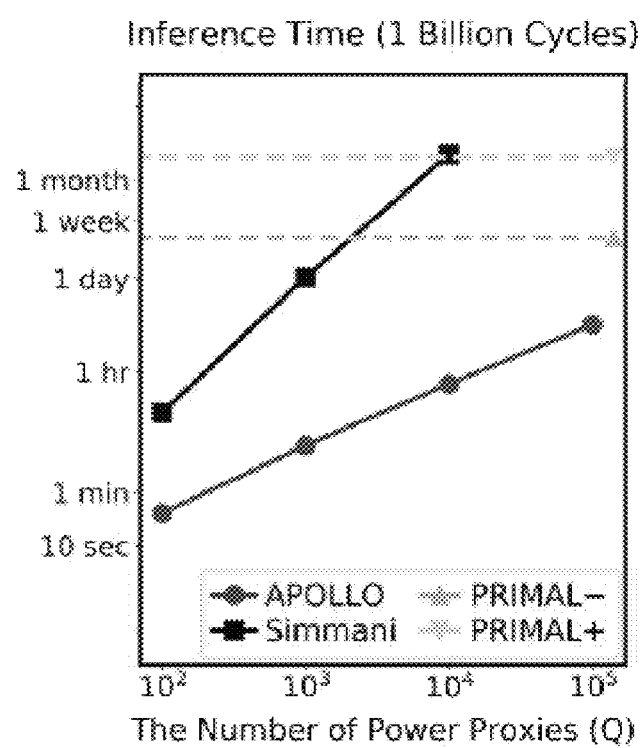

FIG. 20 shows the model inference time when varying the number of power proxies Q. The inference time is reported assuming power predictions on one billion cycles. The estimation is performed with 8 CPU cores of Intel Xeon 6248. With a linear model, APOLLO only takes around one minute with Q<500. The CNN and PCA from PRIMAL take weeks since Q=M, which is in the order of millions. As for Simmani with a linear model with approximately $Q^2$ polynomial terms, its inference time increases quadratically with Q. In comparison, the commercial flow would take hundreds of years to finish the simulation. The training times of various models are shown in Table 3, where all-signal methods take longer training time than the selection-based methods, but all training time is affordable.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Various embodiments described herein may be implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of configuring a power meter comprising:
    providing toggle data from a plurality of signals in a circuit for a plurality of clock cycles;
    generating a plurality of feature vectors, each feature vector dependent upon the toggle data for a plurality of clock cycles in a first time window;
    for each feature vector of the plurality of feature vectors, generating a target power usage value from power usage data for the circuit in a second time window; and
    determining a power model based on the plurality of feature vectors and corresponding target power usage values, said determining including:
        modeling a first power usage as a weighted sum of toggle data in a feature vector for a set of weight values;
        determining values of the weight values to minimize a loss function that includes a difference between a power usage and the modelled power usage, and penalty function of the weight values;
        selecting, as power proxy signals, a subset of signals of the plurality of signals corresponding to weight values with positive values, the subset of signals of the plurality of signals and the corresponding subset of weight values determined simultaneously; and
        outputting identifiers of the power proxy signals in the circuit and the corresponding subset of weight values,
    where the determined power model comprises a weighted sum of toggle data for the power proxy signals for the corresponding subset of weight values.

2. The method of claim 1, where providing said toggle data includes:
    emulating, by a hardware emulator, a workflow to provide the power proxy signals;

determining the toggle data based on transitions in the power proxy signals.

3. The method of claim 1, where providing said toggle data includes:
simulating a workflow to provide toggle data for the power proxy signals; and
estimating power usage in the circuit, for the workflow, from the provided toggle data for the power proxy signals using the determined power model.

4. The method of claim 1, where said modelling the first power usage as the weighted sum of toggle data for the set of weight values includes:
forming a weighted sum of toggle data for the power proxy signals in a first time window, using the set of weight values, to provide the first power usage.

5. The method of claim 4, further comprising forming the weighted sum of toggle data for a plurality of overlapping first time windows.

6. The method of claim 4, further comprising:
averaging toggle data for each power proxy signal over a plurality of clock cycles in a plurality of second time windows, within the first time window, to provide averaged toggle data; and
forming the weighted sum of toggle data as a weighted sum of the averaged toggle data from the plurality of second time windows.

7. The method of claim 1, where said difference is a squared difference over a plurality of clock cycles and said penalty function of the weight values is a minimax concave penalty (MCP) function of the weight values.

8. The method of claim 1, further comprising:
refining values of the subset of weight values using regression.

9. The method of claim 1, where said power usage is an average power usage over the first time window.

10. The method of claim 1, where said determining values of the weight values and said selecting power proxy signals are performed in a plurality of iterations, where an iteration includes:
modeling power usage as a weighted sum of toggle data from prior power proxy signals for a set of weight values;
determining values of the weight values to minimize a loss function that includes a difference between the power usage and the modeled power usage, and penalty function of the weight values;
selecting, as new power proxy signals, a subset of the prior power proxy signals corresponding to weight values with positive values, the subset of new power proxy signals and the corresponding subset of weight values determined simultaneously.

11. The method of claim 1, further comprising:
configuring the power meter to couple to the power proxy signals in the circuit; and
configuring the power meter to generate the toggle data from the power proxy signals.

12. A method of measuring power usage of a primary circuit, the method comprising:
storing, in a power meter circuit, a set of weight values for a plurality of proxy signals in the primary circuit, where selection of the proxy signals and determination of the weight values are performed together in a plurality of iterations of an automated design process for the primary circuit, where an iteration of the automated design process includes:
modeling power usage as a weighted sum of toggle data from prior power proxy signals for a set of weight values;
determining values of the weight values to minimize a loss function that includes a difference between the power usage and the modeled power usage, and penalty function of the weight values; and
selecting, as new power proxy signals, a subset of signals of the prior power proxy signals corresponding to weight values with positive values, the subset of new power proxy signals and the corresponding subset of weight values determined simultaneously;
receiving, by the power meter circuit, toggle data from the plurality of power proxy signals in the primary circuit for a plurality of clock cycles of the primary circuit in a first time window;
for each power proxy signals, averaging the toggle data over one or more clock cycles in a plurality of second time windows, within the first time window, to provide averaged toggle data for the plurality of second time windows;
for each power proxy signal, outputting the averaged toggle data for the plurality of second time windows; and
combining the averaged toggle data from the plurality of second time windows from the plurality of power proxy signals based on a set of weight values to provide the power usage; and outputting the power usage.

13. The method of claim 12, where the first time window is one of a plurality of overlapping time windows.

14. The method of claim 12, where combining the averaged toggle data includes forming a sum of the toggle data weighted by the set of weight values.

15. The method of claim 14, where said averaging is performed after said combining.

16. The method of claim 12, further comprising producing the toggle data from the power proxy signals in the circuit.

17. A power meter for measuring power usage in a circuit, the power meter comprising:
a pre-processor configured to:
receive toggle data for a plurality of power proxy signals in the circuit for a plurality of clock cycles of the circuit in a first time window, where the power proxy signals and an associated set of weight values are determined together in a plurality of iterations of an automated design process for the power meter based on the circuit, where during an iteration of the automated design process the pre-processor is configured to:
model power usage as a weighted sum of toggle data from prior power proxy signals for a set of weight values;
determine values of the weight values to minimize a loss function that includes a difference between the power usage and the modeled power usage, and penalty function of the weight values; and
select, as new power proxy signals, a subset of signals of the prior power proxy signals corresponding to weight values with positive values, the subset of new power proxy signals and the corresponding subset of weight values determined simultaneously;
for each power proxy signal, average the toggle data over one or more clock cycles in a plurality of second time windows, within the first time window, to provide averaged toggle data for the plurality of second time windows and for each power proxy signal, output the averaged toggle data for the plurality of second time windows; and a weighting network configured to:
combine the averaged toggle data from the plurality of second time windows based on the set of weight values to provide the measured power usage.

18. The power meter of claim 17, where the preprocessor is configured to receive toggle data in a plurality of overlapping first time windows and the power meter is configured to provide the measured power usage in each of the plurality of overlapping first time windows.

19. The power meter of claim 17, where the measured power usage comprises a weighted sum of the averaged toggle data from the plurality of second time windows.

20. The power meter of claim 17, further comprising:
one or more change detectors configured to receive power proxy signals from the circuit and produce the toggle data therefrom.

* * * * *